(12) United States Patent
Ichikawa et al.

(10) Patent No.: US 11,491,778 B2
(45) Date of Patent: Nov. 8, 2022

(54) PRINTING DEVICE AND PRINTING METHOD

(71) Applicant: MIMAKI ENGINEERING CO., LTD., Nagano (JP)

(72) Inventors: Youichi Ichikawa, Nagano (JP); Shuhei Hanaoka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/264,852

(22) PCT Filed: Aug. 7, 2019

(86) PCT No.: PCT/JP2019/031023
§ 371 (c)(1),
(2) Date: Feb. 1, 2021

(87) PCT Pub. No.: WO2020/036102
PCT Pub. Date: Feb. 20, 2020

(65) Prior Publication Data
US 2021/0291511 A1    Sep. 23, 2021

(30) Foreign Application Priority Data

Aug. 17, 2018  (JP) .............................. JP2018-153676
Aug. 17, 2018  (JP) .............................. JP2018-153677

(51) Int. Cl.
*B41J 2/01*  (2006.01)
*B41J 2/47*  (2006.01)
(Continued)

(52) U.S. Cl.
CPC . *B41J 2/01* (2013.01); *B41J 2/47* (2013.01); *B41J 11/42* (2013.01); *G06T 11/60* (2013.01)

(58) Field of Classification Search
CPC .......... B41J 2/01; G06K 9/4642; G06T 11/60; G06T 2207/20081; G06T 7/03
See application file for complete search history.

(56) References Cited

U.S. PATENT DOCUMENTS 5,988,790 A * 11/1999 Koike .................. G06K 15/105
347/41
6,328,400 B1 * 12/2001 Yonekubo ............ H04N 1/4057
347/15
(Continued)

FOREIGN PATENT DOCUMENTS

| JP | 2005349638 | 12/2005 |
| JP | 2011000829 | 1/2011 |

(Continued)

OTHER PUBLICATIONS

Machine Translation of WO2014-178201, Retrieved Dec. 15, 2021 WIPO IP Portal. (Year: 2021).*

(Continued)

*Primary Examiner* — John Zimmermann
(74) *Attorney, Agent, or Firm* — JCIPRNET

(57) ABSTRACT

A printing device that performs printing on a medium includes an inkjet head, a main scan driving unit, a sub scan driving unit, and a control unit, where the control unit sets a sub-scanning movement amount based on a basic movement amount, which is a basic movement amount set according to print conditions, and a value indicating a distance for increasing or decreasing the sub-scanning movement amount in the print conditions set at the time of inputting an input correction value. Furthermore, a storage is further provided, which stores a first correction coefficient used when the basic movement amount is within a first range, and a second correction coefficient used when the basic movement amount is within a second range smaller than the first (Continued)

range, and the control unit sets the sub-scanning movement amount based on the basic movement amount and the calculated correction value.

18 Claims, 9 Drawing Sheets

(51) Int. Cl.
    *B41J 11/42*     (2006.01)
    *G06T 11/60*     (2006.01)

(56) References Cited

U.S. PATENT DOCUMENTS

| | | | |
|---|---|---|---|
| 7,008,482 B2 * | 3/2006 | Goto | B41J 2/16579 |
| | | | 118/313 |
| 9,290,027 B2 * | 3/2016 | Nagata | B41J 25/34 |
| 2001/0035875 A1 * | 11/2001 | Suzuki | G06T 11/60 |
| | | | 715/723 |
| 2004/0057770 A1 | 3/2004 | Kojima et al. | |
| 2016/0154995 A1 * | 6/2016 | Magai | G06K 9/4642 |
| | | | 382/195 |

FOREIGN PATENT DOCUMENTS

| | | |
|---|---|---|
| JP | 2014217958 | 11/2014 |
| JP | 2015030149 | 2/2015 |
| JP | 5791410 | 10/2015 |
| JP | 2016221927 | 12/2016 |
| JP | 2018111211 | 7/2018 |

OTHER PUBLICATIONS

Machine Translation of JP-2005349638-A, Retrieved Dec. 17, 2021 EspaceNet. (Year: 2021).*
"International Search Report (Form PCT/ISA/210) of PCT/JP2019/031023", dated Oct. 29, 2019, with English translation thereof, pp. 1-4.
"Search Report of Europe Counterpart Application", dated Mar. 30, 2022, pp. 1-12.

* cited by examiner

| Input pass value | | MAPS speed value | (%) | Offset | (mm) |

FIG. 2A

Input pass value  
MAPS speed value  
⇒ Pass number, basic movement amount

FIG. 2B

| Odd pass | 1 / Odd pass | User feed correction value [μm] | Basic user feed correction value [μm] |
|---|---|---|---|
| 1 | 1.00 | 50 | 50 |
| 1.5 | 0.67 | 33 | 50 |
| 2 | 0.50 | 25 | 50 |
| 2.5 | 0.40 | 20 | 50 |
| 3 | 0.33 | 17 | 50 |
| 3.5 | 0.29 | 14 | 50 |
| 4 | 0.25 | 13 | 50 |
| 0 | 0.00 | 0 | 50 |

| Pass | Basic feed amount [μm] | System feed correction value [μm] |
|---|---|---|
| 0 (origin) | 0 | 0 |
| 2 | 110000 | 200 |
| 1 | 220000 | 440 |

PRINTING DEVICE AND PRINTING METHOD

CROSS-REFERENCE TO RELATED APPLICATION

This application is a 371 application of the international PCT application serial no. PCT/JP2019/031023, filed on Aug. 7, 2019, which claims the priority benefits of Japan application no. 2018-153676, filed on Aug. 17, 2018, and Japan application no. 2018-153677, filed on Aug. 17, 2018. The entirety of each of the above-mentioned patent applications is hereby incorporated by reference herein and made a part of this specification.

TECHNICAL FIELD

This invention relates to a printing device and a printing method.

BACKGROUND ART

Conventionally, an inkjet printer, which is a printing device that performs printing through an inkjet method, has been widely used. Furthermore, as a configuration of an inkjet printer, a serial type configuration that causes an inkjet head to perform a main scan (scanning operation) is widely used (see e.g., Patent Literature 1).

CITATION LIST

Patent Literature

Patent Literature 1: Japanese Unexamined Patent Publication No. 2018-111211

SUMMARY OF INVENTION

Technical Problems

When performing printing through the serial method, a region of a medium (media) to be printed that faces the inkjet head is sequentially changed by causing the inkjet head to perform a sub scan between the main scans. In the sub scan, for example, the inkjet head is moved relative to the medium by conveying the medium by a conveyance amount (feed amount) determined according to the pass number set as the print condition.

Furthermore, in the sub scan, an error may occur in the sub-scanning movement amount (e.g., the conveyance amount of the medium), which is the distance for moving the inkjet head relative to the medium at the time of sub scan, for various reasons. When such an error occurs, an unintended striped pattern (banding) may occur in the print result, and the print quality may degrade. Therefore, it is preferable to appropriately correct the sub-scanning movement amount, rather than simply setting it according to the pass number.

Regarding this point, for example, if the types of pass number that can be set in an inkjet printer is limited to only a few types, it is conceivable to prepare in advance correction parameter for each sub-scanning movement amount corresponding to each pass number that can be set. However, in recent years, due to the sophistication and diversification of performance required for inkjet printers, the number of types of the pass number that can be set may become extremely large. More specifically, for example, when a function such as MAPS (Mimaki Advanced Pass System) installed in an inkjet printer manufactured by Mimaki Engineering Co., Ltd. is used, various pass numbers including non-integers are set. In such a case, if a correction parameter is prepared in advance for each sub-scanning movement amount corresponding to each settable pass number, the required correction parameter may become extremely large.

Therefore, conventionally, it has been desired to correct the sub-scanning movement amount more appropriately in a printing device that causes an inkjet head to perform a main scan and a sub scan. The present invention provides a printing device and a printing method capable of solving the problems described above.

Solutions to Problems

When attempting to correct the sub-scanning movement amount using only a smaller number of correction parameters, for example, a correction parameter for a predetermined print condition is prepared as a standard parameter, where when using other print conditions, the correction parameter may be adjusted according to the difference in the print conditions (e.g., the difference in pass number). However, when performing the actual printing, it may be preferable to actually check the print result and set the correction parameters in order to perform higher quality printing. In such a case, it is preferable to make it possible to set a new correction parameter while taking advantage of the configuration for adjusting the correction parameter.

On the other hand, through intensive research, the inventor of the present application has considered using a correction value (input correction value) input by a user's instruction (e.g., manual input) as at least a part of the parameters used for correcting the sub-scanning movement amount. Furthermore, as such an input correction value, if a value indicating as it is the distance for changing the sub-scanning movement amount under the print conditions at the time of input is used and the print conditions are changed thereafter, consideration has been made to adjust the input correction value input first according to the change in print conditions. With this configuration, for example, the input correction value can be easily and appropriately input when actually checking the print result and setting the correction parameters, and the like. Furthermore, for example, even if the print conditions are subsequently changed, the input correction value can be appropriately adjusted according to the changed print conditions. Thus, the sub-scanning movement amount can be more appropriately corrected, for example, in a printing device that causes the inkjet head to perform the main scan and the sub scan.

Through further thorough researches, the inventor of the present application found features necessary for obtaining such effects and contrived the present invention. In order to solve the problems described above, the present invention provides a printing device that performs printing on a medium; the printing device including an inkjet head that ejects ink to the medium; a main scan driving unit that causes the inkjet head to perform a main scan of ejecting ink while moving relative to the medium in a main scanning direction set in advance; a sub scan driving unit that causes the inkjet head to perform a sub scan of moving relative to the medium in a sub-scanning direction orthogonal to the main scanning direction; a movement amount setting unit that sets a sub-scanning movement amount, which is a distance for moving the inkjet head in the sub-scanning direction relative to the medium in the sub scan; and an input unit that inputs an input correction value input to the movement amount setting unit as a correction value used for correcting the sub-scanning movement amount to the movement amount setting unit; where the movement amount setting unit sets the sub-scanning movement amount based on a basic movement amount, which is a basic movement amount set according to print conditions, and the input correction value input by the input unit; the input unit inputs, as the input correction value, a value indicating a distance for increasing or decreasing the sub-scanning movement amount under the print conditions set at the time of inputting the input correction value; when the input correction value is newly input, the movement amount setting unit sets the sub-scanning movement amount based on the basic movement amount and the input correction value that is newly input; and when the print conditions are changed after the input correction value is newly input, the movement amount setting unit adjusts the input correction value according to the changed print conditions, and sets the sub-scanning movement amount based on the basic movement amount set according to the print conditions after change and the input correction value adjusted according to the changed print conditions.

With this configuration, for example, the input correction value can be easily and appropriately input. Furthermore, for example, even if the print conditions are subsequently changed, the input correction value can be appropriately adjusted according to the changed print conditions. Thus, the sub-scanning movement amount can be more appropriately corrected, for example, in a printing device that causes the inkjet head to perform the main scan and the sub scan.

Furthermore, in this configuration, the input unit inputs a user feed correction value, which is a value specified by the user, as an input correction value. In this case, the user feed correction value is manually input by the user via, for example, an interface using a computer screen. With this configuration, for example, the correction amount of the sub-scanning movement amount can be appropriately adjusted based on the determination of the user who has confirmed the print result.

Furthermore, the correction of the sub-scanning movement amount may be performed by further using parameters other than the user feed correction value. In this case, the movement amount setting unit further utilizes the system feed correction value, which is a correction value set according to the print conditions based on the parameters set in advance in the printing device, for example, and sets the sub-scanning movement amount based on the basic movement amount, the user feed correction value, and the system feed correction value. With this configuration, for example, the sub-scanning movement amount can be corrected more appropriately.

Furthermore, in this configuration, the input unit accepts from a user, for example, an input of an offset value, which is a value indicating as it is a distance for changing the sub-scanning movement amount under the print conditions set at the time of inputting the input correction value, as a value specified by the user. In this case, when referring to indicate as it is the distance for changing the sub-scanning movement amount, this means, for example, to indicate the distance as seen by the user as the distance that needs correction in the sub-scanning movement amount.

Furthermore, the distance that needs correction in the sub-scanning movement amount is, for example, the magnitude of the deviation of the sub-scanning movement amount recognized in the print result.

Furthermore, in this configuration, the inkjet head includes, for example, a nozzle row in which a plurality of nozzles are arranged with positions in the sub-scanning direction displaced from each other. Furthermore, as a print condition, it is conceivable that at least a pass number indicating an average number of main scans performed for each position in a printing range on the medium is set in the movement amount setting unit. In this case, as the basic movement amount, for example, it is conceivable to use a value obtained by dividing the nozzle length, which is the width of the nozzle row of the inkjet head in the sub-scanning direction by the pass number. With this configuration, for example, the basic movement amount can be set appropriately. Furthermore, in this configuration, as the inkjet head, for example, it is conceivable to use a composite head (for example, a staggered head) composed of a plurality of inkjet heads that eject ink of the same color. In this case, the nozzle row of the inkjet head is, for example, the nozzle row in the composite head. Moreover, the nozzle row in the composite head is, for example, a nozzle row formed by combining the nozzles of each of the plurality of inkjet heads forming the composite head.

Furthermore, in this configuration, it is conceivable that a plurality of types of values including non-integer values can be set as the pass number. Furthermore, in this case, for example, it is conceivable to set a value having a pitch size of at least less than or equal to 0.25 as the non-integer value. In such a case, various pass numbers can be set, and thus the values that can be taken as the basic movement amount also vary. On the other hand, when the input correction value is used as described above, the sub-scanning movement amount can be appropriately set even when there are many values that can be taken as the basic movement amount. The pitch size of the pass number is preferably less than or equal to 0.1, and more preferably less than or equal to 0.01. Moreover, in this case, for example, it is conceivable to set an arbitrary pass number with a numerical value having a predetermined number of digits after the decimal point.

Furthermore, in this configuration, for example, it is conceivable to use a printing device capable of continuously executing printing operations corresponding to a plurality of print jobs in which different print conditions are set. In this case, continuously executing printing operations corresponding to a plurality of print jobs means, for example, automatically and sequentially performing the printing operation corresponding to each print job by automatically and sequentially processing the plurality of print jobs supplied to the printing device. In such a case, since the set print conditions may differ for each print job, the print conditions may change as the print job changes. Therefore, in this case, for example, it is conceivable to adjust the input correction value according to the print conditions set in the next print job in the movement amount setting unit after the printed matter corresponding to one of the plurality of print jobs is printed and before the operation of printing the printed matter corresponding to the next print job is started. Furthermore, in this case, the movement amount setting unit further sets the sub-scanning movement amount based on, for example, the basic movement amount set according to the print conditions corresponding to the next print job and the input correction value adjusted according to the print conditions. With this configuration, for example, printing operations corresponding to a plurality of print jobs can be appropriately performed with higher accuracy.

Furthermore, in the printing device, when the printing operation is executed based on the print job in which the print conditions are set, for example, it can be considered that the user observes the progress of printing to change the input correction value in the middle of the printing operation. More specifically, in this case, for example, it is conceivable that a new input correction value is input from the input unit while printing the printed matter corresponding to one print job. In this case, the movement amount setting unit sets a new sub-scanning movement amount based on, for example, the basic movement amount and the input correction value that is newly input. Then, the sub scan driving unit causes the inkjet head to perform the sub scan according to the new sub-scanning movement amount from the middle of printing the printed matter corresponding to one print job. With such a configuration, for example, the correction of the sub-scanning movement amount can be performed more flexibly and appropriately.

It is conceivable to use a printing method having features similar to the above, and the like for the configuration of the present invention. In this case as well, for example, effects similar to the above can be obtained.

In addition, it is conceivable to prepare an amount for changing the sub-scanning movement amount under predetermined print conditions as a standard parameter, and adjust the correction parameter so as to be proportional to the sub-scanning movement amount.

However, the inventor of the present application actually conducted various experiments and the like, and for example, found that the error may increase in the result of the correction of the sub-scanning movement amount if simply made proportional to the sub-scanning movement amount when the maximum value of the value that can be taken as the sub-scanning movement amount becomes large, such as when a large-sized inkjet head is used. More specifically, in this case, for example, in the result of comparing a case where the correction amount required under the print condition in which the pass number is 1 is used as a standard parameter, and a case where the correction amount required under the print condition in which the pass number is 2 is used as a standard parameter, an error exceeding an inter-dot distance (inter-dot distance in the sub-scanning direction) corresponding to the resolution of printing may occur in the value of the parameter after adjustment. If such an error occurs, banding or the like may not be appropriately prevented even if the sub-scanning movement amount is corrected.

On the other hand, the inventor of the present application has considered to make the parameters for correction different depending on the magnitude of the basic movement amount corresponding to the sub-scanning movement amount before correction. More specifically, consideration has been made to use a first correction coefficient as a parameter for correction when the basic movement amount is within a predetermined first range, and use a second correction coefficient as a parameter for correction when the basic movement amount is within a second range smaller than the first range. With this configuration, for example, even when the maximum value of the values that can be taken as the scanning movement amount becomes large, the sub-scanning movement amount can be corrected more appropriately with higher accuracy.

Moreover, in this case as well, since only a limited number of correction coefficients need to be prepared, the sub-scanning movement amount can be appropriately corrected by using only a small number of correction parameters.

Through further thorough researches, the inventor of the present application found features necessary for obtaining such effects and contrived the present invention. In order to solve the problems described above, the present invention provides a printing device that performs printing on a medium; the printing device including an inkjet head that ejects ink to the medium; a main scan driving unit that causes the inkjet head to perform a main scan of ejecting ink while moving relative to the medium in a main scanning direction set in advance; a sub scan driving unit that causes the inkjet head to perform a sub scan of moving relative to the medium in a sub-scanning direction orthogonal to the main scanning direction; a movement amount setting unit that sets a sub-scanning movement amount, which is a distance for moving the inkjet head in the sub-scanning direction relative to the medium in the sub scan; and a correction coefficient storage that stores a correction coefficient, which is a coefficient used to calculate a calculated correction value calculated as a correction value used to correct the sub-scanning movement amount; where the movement amount setting unit sets the sub-scanning movement amount based on a basic movement amount, which is a basic movement amount set according to print conditions, and the calculated correction value; the correction coefficient storage stores, as the correction coefficient, at least, a first correction coefficient used when the basic movement amount is within a first range, and a second correction coefficient used when the basic movement amount is within a second range smaller than the first range; when the basic movement amount is within the first range, the movement amount setting unit calculates the calculated correction value based on the basic movement amount and the first correction coefficient; and when the basic movement amount is within the second range, the movement amount setting unit calculates the calculated correction value based on the basic movement amount and the second correction coefficient.

With this configuration, for example, the sub-scanning movement amount can be corrected appropriately with high accuracy. Moreover, in this case, for example, since only a limited number of correction coefficients need to be prepared, the sub-scanning movement amount can be appropriately corrected by using only a small number of correction parameters. Furthermore, in this configuration, for example, it is conceivable to use a coefficient indicating a linear function that associates the basic movement amount with the calculated correction value as the first and second correction coefficients. Moreover, in this case, for example, it is conceivable to use a coefficient different from the first correction coefficient as the second correction coefficient.

Furthermore, in this configuration, the inkjet head includes, for example, a nozzle row in which a plurality of nozzles are arranged with positions in the sub-scanning direction displaced from each other. In this case, it is conceivable to use, for example, a range including a case where the nozzle length, which is the width of the nozzle row of the inkjet head in the sub-scanning direction, and the basic movement amount are equal to each other as the first range. Furthermore, it is conceivable to use, for example, a range including all basic movement amounts less than or equal to or less than a predetermined movement amount smaller than the nozzle length as the second range. Furthermore, in this case, it is conceivable to use, for example, a coefficient indicating that the calculated correction value is calculated proportionately to the basic movement amount as the second correction coefficient. The calculation of the calculated correction value proportionately to the basic movement amount means that, for example, the linear function that associates the basic movement amount with the calculated correction value becomes a function indicating a straight line passing through the origin point. With this configuration, for example, the first range and the second range can be appropriately separated. Furthermore, for example, the calculated correction value can be appropriately calculated for the basic movement amount included in the second range.

Furthermore, in this configuration, it is conceivable to use, for example, a composite head (e.g., a staggered head) composed of a plurality of inkjet heads that eject ink of the same color as the inkjet head. In this case, the nozzle row of the inkjet head is, for example, the nozzle row in the composite head. Moreover, the nozzle row in the composite head is, for example, a nozzle row formed by combining the nozzles of each of the plurality of inkjet heads forming the composite head.

Furthermore, in this configuration, it is conceivable to use, for example, a movement amount equal to half of the nozzle length as the predetermined movement amount. Moreover, in this case, it is conceivable to use, for example, a range including all basic movement amounts larger than a predetermined movement amount as the first range. In this case, as the first correction coefficient, it is conceivable to use, for example, a coefficient indicating that the calculated correction value corresponding to the basic movement amount linearly changes between the basic movement amount equal to half of the nozzle length and the basic movement amount equal to the nozzle length. When referring to the calculated correction value corresponding to the basic movement amount linearly changing, this means that, for example, the relationship associating the basic movement amount and the calculated correction value becomes a linear function. With this configuration, for example, the calculated correction value can be appropriately calculated for the basic movement amount included in the first range. Furthermore, in this configuration, a slope in the linear relationship indicated by the first correction coefficient is different from a slope in the proportional relationship indicated by the second correction coefficient. Moreover, in this case, it is conceivable to use, for example, a function corresponding to a straight line not passing through the origin point as the linear function described above that corresponds to the first range.

In addition, in this configuration, in a case where an inter-dot distance corresponding to the resolution in the sub-scanning direction set according to the print conditions is defined as a distance between sub-scanning dots, and when the basic movement amount is equal to the nozzle length, the calculated correction value calculated based on the first correction coefficient is set as a first value, and a value when a correction value is calculated according to a proportional relationship indicated by the second correction coefficient is set as a second value, it is considered that a difference between the first value and the second value becomes larger than the distance between the sub-scanning dots. In such a case, for example, if the sub-scanning movement amount is corrected using only one type of correction coefficient, it is conceivable that an error exceeding the distance between the sub-scanning dots occur in the sub-scanning movement amount after correction when for example, the basic feed amount becomes equal to the nozzle length, or the basic feed amount becomes half of the nozzle length. If such an error occurs, banding or the like may not be appropriately prevented even if the sub-scanning movement amount is corrected. On the other hand, the occurrence of such an error can be appropriately prevented when the first correction coefficient and the second correction coefficient are used as described above. Furthermore, for example, the sub-scanning movement amount thus can be corrected more appropriately with higher accuracy.

A situation where the above error occurs can be considered as, for example, a situation where an error larger than the distance between the sub-scanning dots occurs with respect to an ideal correction value in any of the sub-scanning movement amounts when the correction value is calculated using only one proportional coefficient. More specifically, in this case, for example, when a correction value for correctly setting the sub-scanning movement amount corresponding to each basic feed amount is defined as an ideal correction value, and a correction value when the calculated correction value is set proportionately to the basic feed amount using only one proportional coefficient is defined as a simple proportional correction value, if one proportional coefficient is set so that the ideal correction value and the simple proportional correction value become equal with respect to any of the basic feed amounts, the difference between the ideal correction value corresponding to such basic feed amount and the simple proportional correction value becomes larger than the distance between the sub-scanning dots for other basic movement amounts. Even in such a case, the occurrence of such an error can be appropriately prevented by using the first correction coefficient and the second correction coefficient. Furthermore, for example, the sub-scanning movement amount thus can be corrected more appropriately with higher accuracy.

Furthermore, in this configuration, for example, it is conceivable that at least a pass number indicating an average number of main scans performed for each position in a printing range on the medium is set as the print condition. In this case, for example, it is conceivable to use a value obtained by dividing the nozzle length of the inkjet head by the pass number as the basic movement amount. With this configuration, for example, the basic movement amount can be set appropriately.

Furthermore, in this configuration, it is conceivable that a plurality of types of values including non-integer values can be set as the pass number. Furthermore, in this case, for example, it is conceivable to set a value having a pitch size of at least less than or equal to 0.25 as the non-integer value. In such a case, various pass numbers can be set, and thus the values that can be taken as the basic movement amount also vary. On the other hand, when the input correction value is used as described above, the sub-scanning movement amount can be appropriately set even when there are many values that can be taken as the basic movement amount. The pitch size of the pass number is preferably less than or equal to 0.1, and more preferably less than or equal to 0.01. Moreover, in this case, for example, it is conceivable to set an arbitrary pass number with a numerical value having a predetermined number of digits after the decimal point.

It is conceivable to use a printing method having features similar to the above, and the like for the configuration of the present invention. In this case as well, for example, effects similar to the above can be obtained.

Effect of the Invention

According to the present invention, for example, the sub-scanning movement amount can be more appropriately corrected in a printing device that causes an inkjet head to perform the main scan and the sub scan.

BRIEF DESCRIPTION OF THE DRAWINGS

FIG. 1A shows one example of a configuration of a main part of the printing device 10. FIG. 1B shows an example of a configuration of an inkjet head 102.

FIGS. 2A and 2B are views describing an operation of setting a feed amount. FIG. 2A shows an example of a parameter in which a setting from the user is accepted in the input unit 24. FIG. 2B is a view describing an operation of setting the feed amount based on a parameter specified by the user.

FIGS. 3A to 3D show an example of an operation of setting or changing various parameters.

FIGS. 4A to 4C show an example of an operation of setting or changing various parameters.

FIG. 5A is a table showing an example of a relationship between the odd pass set according to the print condition and the offset value. FIG. 5B is a graph showing an example of a relationship between the reciprocal of the odd pass and the user feed correction value.

FIG. 6A shows an example of the relationship between a specific basic feed amount associated with the correction coefficient and the correction value (system feed correction value). FIG. 6B is a graph showing the relationship between the basic feed amount and the correction value.

FIG. 8A shows an example of a method of calculating the calculated correction value when the corresponding pass number is within the range of 1 to 2. FIG. 8B shows an example of a method of calculating the calculated correction value when the corresponding pass number is greater than or equal to 2.

DESCRIPTION OF EMBODIMENTS

Figure 1A:
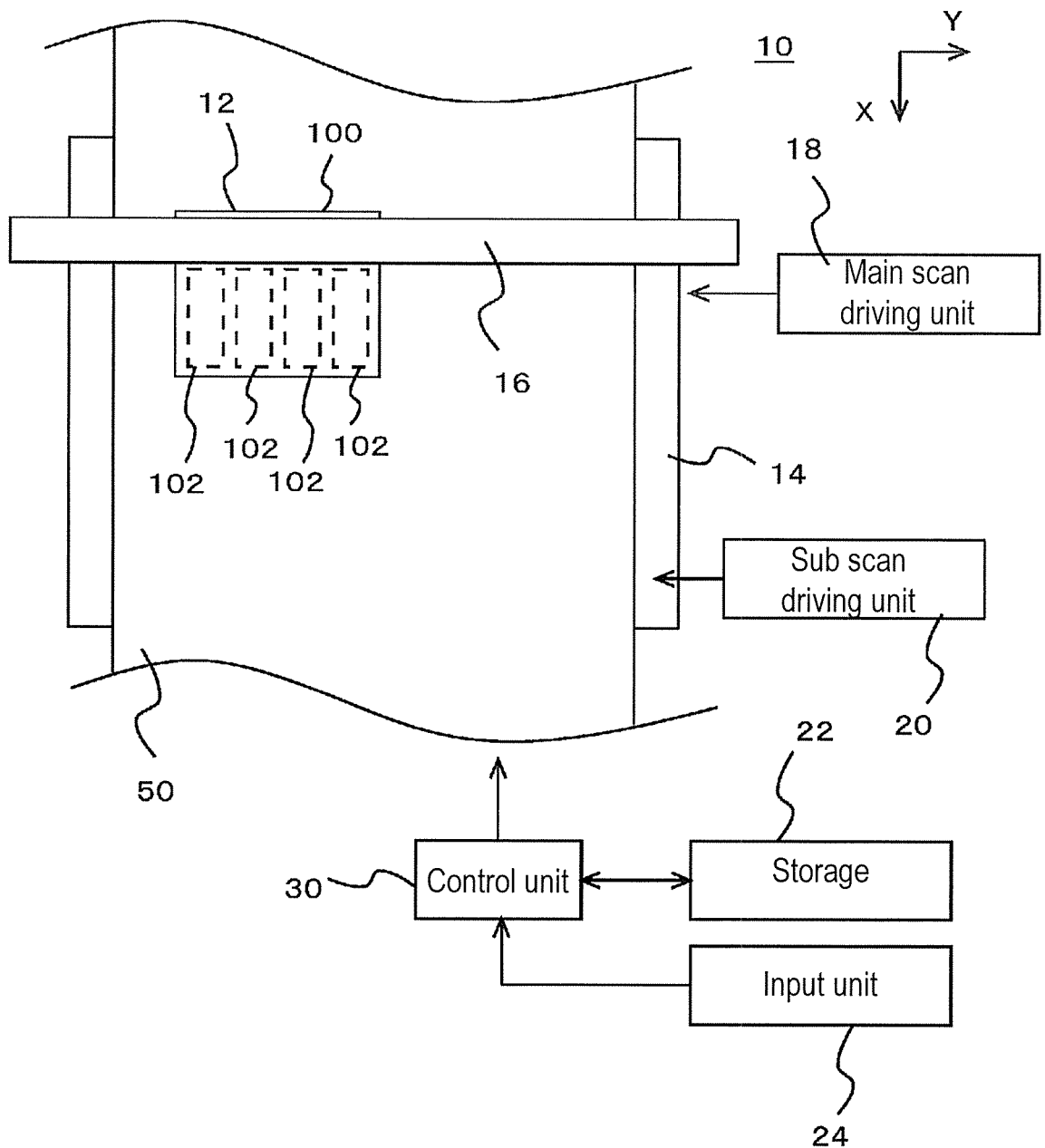
FIGS. 1A and 1B are views describing a printing device 10 according to one embodiment of the present invention.
Figure 1B:
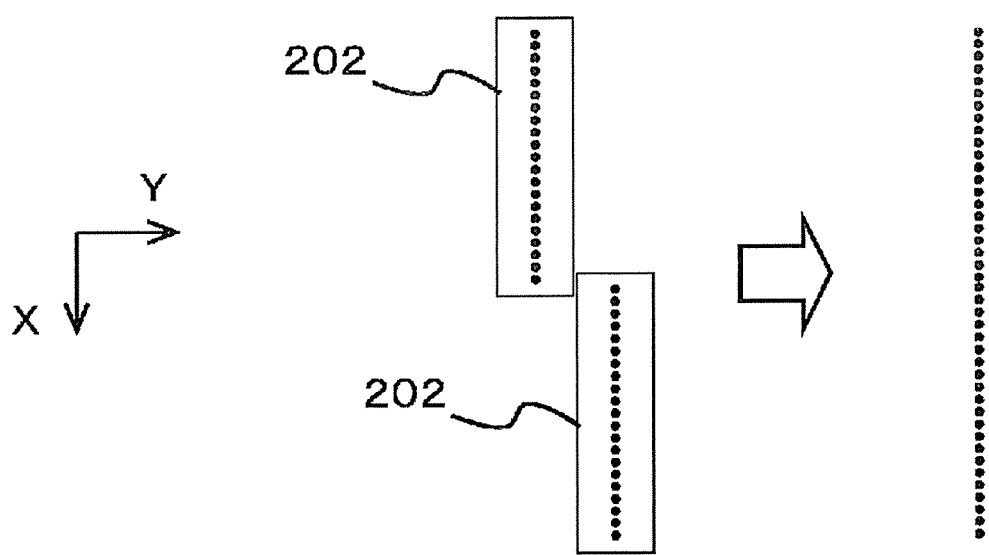

Hereinafter, an embodiment according to the present invention will be described with reference to the drawings. FIGS. 1A and 1B are views describing a printing device 10 according to one embodiment of the present invention. FIG. 1A shows one example of a configuration of a main part of the printing device 10. Note that, except for the points described below, the printing device 10 may have features same as or similar to the known inkjet printers. For example, the printing device 10 may further have a configuration same as or similar to a known inkjet printer, in addition to the configuration described below.

The printing device 10 is an inkjet printer that performs printing on a medium (media) 50 to be printed through an inkjet method. More specifically, in the present example, the printing device 10 includes a head unit 12, a platen 14, a guide rail 16, a main scan driving unit 18, a sub scan driving unit 20, a storage 22, an input unit 24, and a control unit 30.

The head unit 12 is a part that ejects ink to the medium 50. Moreover, in the present example, the head unit 12 includes a carriage 100 and plurality of inkjet heads 102. The carriage 100 is a holding member that holds the plurality of inkjet heads 102. In this example, as shown in the figure, for example, the carriage 100 holds the plurality of inkjet heads 102 so as to be lined in a main scanning direction (Y direction in the drawing) orthogonal to a sub-scanning direction, with the positions in the sub-scanning direction (X direction in the drawing) set in advance in the printing device 10 aligned.

Furthermore, each of the plurality of inkjet heads 102 is an inkjet head that ejects inks of each color used for printing to the medium 50, and ejects inks of different colors from each other. In the present example, the head unit 12 includes the plurality of inkjet heads 102, each of which ejects ink of each color of yellow (Y), magenta (M), cyan (C), and black (K). Moreover, in this example, each of the inkjet heads 102 has a nozzle row in which a plurality of nozzles is arranged so that the positions in the sub-scanning direction are displaced from each other, and ink of each color is ejected from each nozzle.

The platen 14 is a table-shaped member that supports the medium 50 at a position facing the head unit 12. The guide rail 16 is a rail-like member extending in the main scanning direction, and guides the movement of the head unit 12 in the main scanning direction.

The main scan driving unit 18 is a driving unit that causes the head unit 12 to perform the main scan (scanning operation). In this case, the main scan is, for example, an operation of ejecting the ink while moving in the main scanning direction. To cause the head unit 12 to perform the main scan means, for example, to cause the inkjet head 102 of the head unit 12 to perform the main scan. Moreover, in the present example, the printing device 10 executes the printing operation through the serial method by causing the head unit 12 to perform the main scan. Furthermore, at the time of the main scan in the present example, the head unit 12 moves in the main scanning direction along the guide rail 16. Moreover, regarding the main scan, the movement of the head unit 12 in the main scanning direction is a relative movement with respect to the medium 50. Therefore, in the modified example of the printing device 10, the medium 50 side may be moved by fixing the position of the head unit 12, and for example, moving the platen 14.

The sub scan driving unit 20 is a driving unit that causes the head unit 12 to perform the sub scan. In this case, the sub scan is, for example, an operation of moving relatively to the medium 50 in the sub-scanning direction. To cause the head unit 12 to perform the sub scan means, for example, to cause the inkjet head 102 of the head unit 12 to perform the sub scan. In the present example, the sub scan driving unit 20 causes the head unit 12 to perform the sub scan by conveying the medium 50 in the conveyance direction parallel to the sub-scanning direction using, for example, a belt member (not shown). Furthermore, in this case, the sub scan driving unit 20 conveys the medium 50 by the feed amount set by the control unit 30 according to the pass number of printing or the like between each main scan. In this case, the feed amount at the time of the sub scan is an example of the sub-scanning movement amount. Furthermore, the sub-scanning movement amount is a distance for moving the inkjet head 102 in the sub-scanning direction relative to the medium 50 in the sub scan. The medium 50 may be conveyed not only by the belt member but also by using, for example, a roller or the like. Moreover, in the modified example of the printing device 10, the sub scan may be performed by fixing the position of the medium 50 and moving the head unit 12 side.

The storage 22 is a storage means that stores parameters specifying the printing operation. In the present example, the storage 22 is an example of a correction coefficient storage, and stores at least a correction coefficient which is a parameter used for correcting the feed amount. In this case, the correction coefficient is a coefficient used when calculating a calculated correction value, which is the correction value (feed correction value) used for correcting the feed amount. Furthermore, the correction of the feed amount is a correction performed to set the feed amount. The correction coefficient and the like will be described in more detail later. In addition, the input unit 24 is an input means for inputting parameters specifying the printing operation. Furthermore, in the present example, the input unit 24 receives at least a parameter used for correcting the feed amount from the user (user) and inputs it to the control unit 30. The parameters used to correct the feed amount will be described in more detail later.

The control unit 30 is, for example, the CPU of the printing device 10, and controls the operation of each part of the printing device 10 according to a preset program. More specifically, the printing device 10 causes each nozzle in the head unit 12 to eject ink according to an image to be printed, for example, at the time of control of the main scan by the head unit 12. Furthermore, in the present example, the control unit 30 is also an example of a movement amount setting unit, and sets the feed amount at the time of the sub scan according to the print conditions. Moreover, in this case, the control unit 30 corrects the feed amount based on the parameters stored in the storage 22 and the parameters input from the input unit 24. The operation of setting the feed amount in the control unit 30 will be described in more detail later.

Here, as described above, the printing device 10 of the present example may have characteristics same as or similar to a known inkjet printer, except for the points described above and below. For example, it is conceivable to use various known types of ink as the ink ejected from each of the inkjet heads 102 in the head unit 12. Furthermore, in this case, it is preferable that the printing device 10 further includes fixing means for fixing the ink on the medium 50, according to the type of ink used. More specifically, when an ink (evaporation-drying type ink) that fixes to the medium 50 by evaporating the solvent is used as the ink, it is conceivable to use a heater or the like for heating the medium or the ink as the fixing means. In this case, the heater is disposed, for example, in the platen 14 at a position facing the head unit 12 with the medium 50 in between. Furthermore, as such an evaporation-drying type ink, for example, it is conceivable to use various known aqueous inks, solvent inks (solvent inks), and the like. Furthermore, as the ink, for example, an ultraviolet curable ink (UV ink) that cures by irradiation of ultraviolet rays may be used. In this case, as the fixing means, it is conceivable to use an ultraviolet irradiation means such as a UV LED. Moreover, in this case, it is conceivable to dispose the ultraviolet irradiation means at a position adjacent to the plurality of inkjet heads 102 (position adjacent in the main scanning direction) in the head unit 12.

Moreover, as described above, in the present example, the inkjet head 102 for each color has a nozzle row in which a plurality of nozzles are arranged with the positions in the sub-scanning direction displaced from each other. In this case, as the inkjet head 102 for each color, for example, as shown in FIG. 1B, a composite head (e.g., a staggered head etc.) including a plurality of inkjet heads that eject ink of the same color may be used. FIG. 1B shows an example of a configuration of the inkjet head 102 when the staggered head is used as the inkjet head 102.

In the case shown in the figure, the inkjet head 102 for each color is formed by a plurality of unit heads 202 that eject ink of the same color. Each of the plurality of unit heads 202 is an inkjet head that forms a staggered head, and has, for example, as shown in the figure, a nozzle row in which nozzles are arranged in the sub-scanning direction. The plurality of unit heads 202 are arranged with the positions in the sub-scanning direction displaced so that the nozzle rows of the inkjet head 102 are formed by combining the nozzle rows of the unit heads 202. In this case, when referring to the nozzle row of the inkjet head 102 being formed by combining the nozzle rows of the plurality of unit heads 202, this means that for example, as shown in the right side portion of FIG. 1B, one virtual nozzle row is formed when focusing on the position in the sub-scanning direction of each nozzle in the respective unit heads 202. Furthermore, in this case, this virtual nozzle row can be considered as the nozzle row of the inkjet head 102. In addition, in the present example, as the unit head 202, for example, an inkjet head having a length of about 4 inches in the sub-scanning direction is used. As a result, the length (width in the sub-scanning direction) of the nozzle row of the inkjet head 102 formed by two unit heads 202 is 220 mm (220,000 µm).

Now, the parameters used for correcting the feed amount, the operation of setting the feed amount in the control unit 30, and the like will be described in more detail. FIGS. 2A and 2B are views describing an operation of setting the feed amount. FIG. 2A shows an example of a parameter in which the setting from the user is accepted in the input unit 24. FIG. 2B is a view describing an operation of setting the feed amount based on a parameter specified by the user.

In this example, the input unit 24 accepts at least input of an input pass value, a MAPS speed value, and an offset (offset value) from the user. Among these, the input pass value and the MAPS speed value are parameters specifying the print conditions. Furthermore, in the present example, the input pass value is a numerical value that becomes the basis for setting the pass number, and an integer value of greater than or equal to 1 is specified by the user. In this case, the pass number is a number indicating the average number of main scans performed for each position in the printing range on the medium. Moreover, in the present example, the pass number is set in consideration of the MAPS speed value indicating the degree to which MAPS (Mimaki Advanced Pass System) process is applied, in addition to the input pass value. Therefore, the input pass value can be considered to correspond to, for example, a value obtained by subtracting the influence of MAPS process from the pass number set at the time of printing. In addition, the input pass value can be considered as, for example, a value equivalent to the pass number set when the MAPS process is disabled (OFF).

As described above, the MAPS speed value is a value indicating the degree to which the MAPS process is applied. The MAPS process is, for example, a process of adjusting the density (ejection density) of ink ejected from each nozzle by applying a mask to make banding less noticeable. In the MAPS process, for example, the ejection density is adjusted by using a gradation type mask instead of a checkered pattern mask or the like. Furthermore, in this case, by reducing the feed amount in accordance with the amount of lowering the ejection density according to the mask, the boundary portion of the pass is overlapped to make the boundary of the pass less noticeable. Therefore, when performing the MAPS process, the feed amount changes according to the MAPS movement speed. In addition, the set pass number changes accordingly.

Therefore, when performing the MAPS process, for example, as the pass number, a non-integer value (odd pass) may also be set by adjusting the integer value specified as the input pass value according to the MAPS speed value. Therefore, the configuration for performing the MAPS process can be considered as an example of a configuration in which a plurality of types of values including non-integer values can be set. Furthermore, in this case, in order to perform the MAPS process and the like flexibly with high accuracy, it is preferable to be able to set a value with a pitch size of at least less than or equal to 0.25 for the non-integer value which is the pass number. The pitch size of the pass number is preferably less than or equal to 0.1, and more preferably less than or equal to 0.01. Moreover, in this case, for example, it is more preferable to have an arbitrary pass number settable with a numerical value having a predetermined number of digits after the decimal point. Furthermore, in the present example, the pass number is calculated according to the input pass value and the MAPS speed value, so that an arbitrary value can be set at pitches of 0.01. In this case, the input pass value and the MAPS speed value can be considered as parameters specifying the pass number as the print condition.

The MAPS speed value can be considered as, for example, a parameter indicating the degree of dispersing dots formed on the medium. Furthermore, as the MAPS speed value, for example, it is conceivable to use a numerical value in the range of 0 to 100%. In this case, a state where the MAPS speed value is set to 100% indicates the state where the mask equivalent to the input pass value is applied. Therefore, when the MAPS speed value is 100%, the pass number is equal to the input pass number. Moreover, when the MAPS speed value is less than 100%, the pass number becomes greater than the input pass value, according to the MAPS speed value. More specifically, for example, if the input pass value is 2 and the MAPS speed value is 100%, a mask equivalent to 2 is applied in the MAPS process. If the input pass value is 2 and the MAPS speed value is 50%, a mask equivalent to 4 passes is applied in the MAPS process. Furthermore, in this case, as the setting of the MAPS speed value becomes a smaller value, the width overlapping at the boundary part of the pass increases (the overlap of the passes increases), and thus the boundary of the pass becomes difficult to see, which has an effect of suppressing banding. In addition, the print conditions such as the input pass value and the MAPS speed are not necessarily specified by the user, and the conditions specified in the print job indicating the image to be printed may be used. In this case, it is conceivable to use the print condition specified in the print job as the initial value and accept the change by the user.

Furthermore, among the parameters shown in FIGS. 2A and 2B, the offset value is a parameter used for correcting the feed amount. Moreover, in this case, the offset value is an example of an input correction value input by the input unit 24, and is also an example of a user feed correction value which is a value specified by the user as the input correction value. In the present example, the offset value is manually input by the user via an interface or the like using a computer screen, as necessary. Furthermore, as the offset value, a value indicating as it is the distance for changing the feed amount under the print conditions set at the time of inputting the offset value is used. To indicate as it is the distance for changing the feed amount means, for example, to indicate the distance as seen by the user as the distance that needs correction in the feed amount. Furthermore, the distance that needs correction in the feed amount is, for example, the magnitude of the deviation of the feed amount recognized in the print result (feed deviation amount, feed correction amount). Furthermore, the offset value can be considered as, for example, a value indicating a distance for increasing or decreasing the feed amount under the print conditions set at the time of input of the offset value.

When the parameter used for correcting the feed amount is input by a method different from that of the present example, for example, it is conceivable to input a value converted into a standard print condition set in advance. Furthermore, when considering it as a computer system, it is considered that the subsequent process becomes easier if the parameters are input in this way. However, when correcting the feed amount, it is conceivable to input a parameter corresponding to an extremely small distance based on the user's feeling. In such a case, if conversion or the like according to the standard print conditions is required, it is considered that an unintended change is likely to be made due to a calculation mistake or the like. Further, it is conceivable to correct the feed amount, for example, in the middle of the printing operation. In such a case, if conversion or the like according to the standard print conditions is required, the time required for inputting the parameters becomes long, and the correction is delayed by that amount. On the other hand, according to the present example, since the amount of deviation of the feed amount as seen by the user can be set as an offset value under arbitrary print conditions, the correction amount of the feed amount can be adjusted rapidly and appropriately based on the determination of the user who confirmed the print result. As a result, for example, a correction operation that is easy and has few errors can be appropriately realized.

Next, the operation of setting the feed amount in the present example will be described in more detail. In the operation of setting the feed amount, the control unit 30 first sets the pass number and the basic movement amount based on the input pass value and the MAPS speed value, as shown in FIG. 2B. In this case, the pass number is the pass number (odd pass) obtained by adjusting the input pass value according to the MAPS speed value, as described above. Furthermore, in the present example, the basic movement amount is the basic movement amount used when setting the feed amount in the sub scan, and is set according to the print conditions. Moreover, in the present example, the basic movement amount is a value equivalent to the feed amount before the correction is performed. More specifically, as the basic movement amount, a value obtained by dividing the nozzle length of the inkjet head by the pass number is set. Furthermore, as described above, in the present example, the pass number is calculated according to the input pass value and the MAPS speed value, so that an arbitrary value can be set at pitches of 0.01. Therefore, various values can be set within the range of less than or equal to the nozzle length for the value that can be taken as the basic movement amount.

Furthermore, the control unit 30 sets the feed amount by correcting the basic movement amount calculated in this way based on the offset value. In the present example, as the correction value used for the correction of the feed amount, a system feed correction value is further used in addition to the offset value set by the user. In this case, the system feed correction value is a correction value set according to the print conditions based on the parameters set in advance in the printing device 10.

Therefore, the operation of setting the feed amount in the present example can be considered as, for example, an operation of setting the feed amount based on the basic movement amount, the offset value, and the system feed correction value. In this case, for example, the standard correction corresponding to the device characteristics (error generated between the machines) of the printing device 10 can be easily and appropriately performed by performing the correction using the system feed correction value. Furthermore, for example, fine adjustments and the like required at the time of actual printing can be further performed according to the print conditions, the characteristics of the medium to be used, and the like by performing the correction while further using the offset value specified by the user. Therefore, according to the present example, for example, the feed amount can be appropriately corrected with high accuracy.

Next, a method of using the offset value in the present example will be described in more detail. As described above, in the present example, as the offset value, a value indicating as it is the distance for changing the feed amount under the print conditions set at the time of inputting the offset value is used. However, in the printing device 10, the print conditions may be changed after the offset value is input. More specifically, in the printing device 10, for example, it is conceivable to use a print job in which print conditions are set as a print job indicating a printed matter to be printed by the printing device 10. In this case, it is conceivable that the print conditions may be changed for each print job. Furthermore, in this case, it is conceivable that the value to be set as the offset value changes as the print conditions change. More specifically, the amount of correction applied when setting the feed amount is usually considered to be substantially proportional to the feed amount. Therefore, when the feed amount changes due to a change in print conditions, the distance for changing the feed amount at the time of correction also changes. On the other hand, in the present example, the offset value, in which the value as seen by the user under arbitrary print conditions is set, is automatically adjusted according to the feed amount that changes according to the change in print conditions.

Figure 3A:
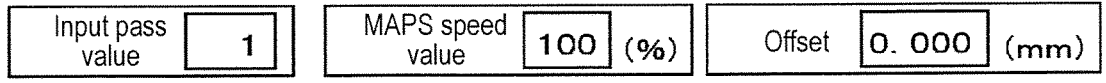
FIGS. 3A to 3D are views describing adjustment of an offset value in more detail.

FIGS. 3A to 3D and FIGS. 4A to 4C are views describing the adjustment of the offset value in more detail. FIGS. 3A to 3D and FIGS. 4A to 4C show an example of the operation of setting or changing various parameters. Furthermore, FIG. 3A is a view showing an example of a state in which the input pass value and the MAPS speed value are set without specifying the offset value, and shows an example for a case where the input pass value is set to 1 and the MAPS speed value is set to 100%. This state can be considered as, for example, a state in which the feed amount is set without using the user feed correction value specified by the user.

Figure 3B:
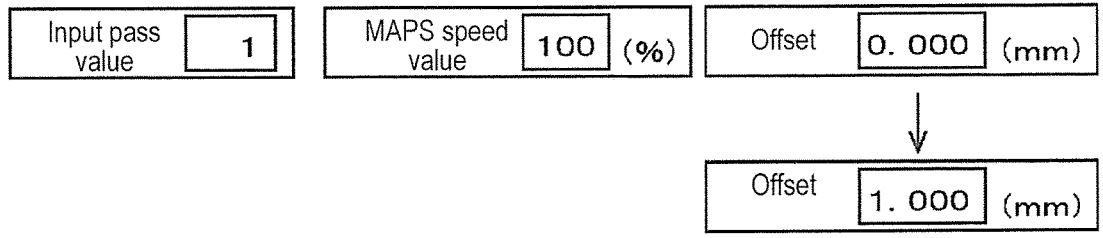

Furthermore, FIG. 3B shows a state in which the offset value is changed to 1.000 mm from the state shown in FIG. 3A. In this case, according to the user's specification of the offset value, the control unit 30 performs, for example, a feed correction value updating process, which is a process of updating the value stored as the offset value. As a result, the newly specified offset value is used in the subsequent process.

Figure 3C:
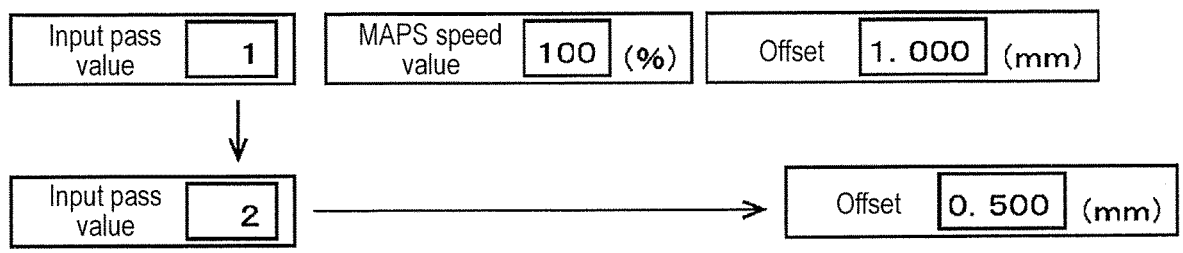

Furthermore, FIG. 3C shows a state in which the input pass value is changed to 2 from the state shown in FIG. 3B. In this case, the basic movement amount, or the like calculated based on the input pass value also changes with change in the input pass value. Therefore, in this case, the offset value also needs to be changed in accordance with the change in the input pass value. On the other hand, in the present example, when the input pass value is changed, the control unit 30 performs the feed correction value updating process based on the changed input pass value. More specifically, in this case, a new basic movement amount is calculated based on the new input pass value, and the offset value is changed so as to be proportional to the basic movement amount. As a result, in the case shown in FIG. 3C, the offset value is changed to 0.500 mm by the feed correction value updating process.

Figure 3D:
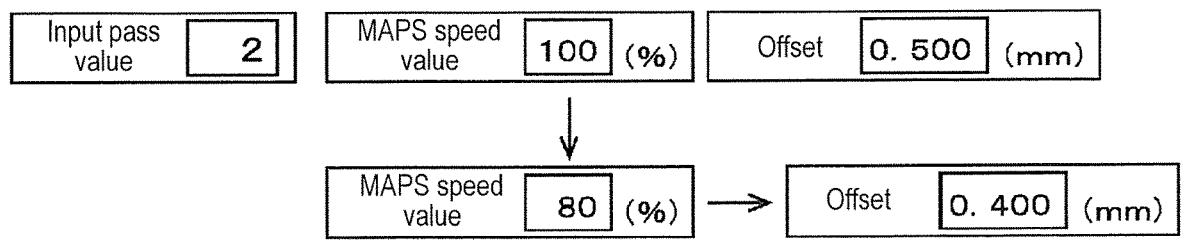

Furthermore, FIG. 3D shows a state in which the MAPS speed value is changed to 80% from the state shown in FIG. 3C. In this case, the basic movement amount, or the like calculated based on the MAPS speed value also changes with change in the MAPS speed value. Therefore, in this case, the offset value also needs to be changed in accordance with the change in the MAPS speed value. On the other hand, in the present example, when the MAPS speed value is changed, the control unit 30 performs the feed correction value updating process based on the changed MAPS speed value. More specifically, in this case, a new basic movement amount is calculated based on the new MAPS speed value, and the offset value is changed so as to be proportional to the basic movement amount. As a result, in the case shown in FIG. 3D, the offset value is changed to 0.400 mm by the feed correction value updating process.

Figure 4A:
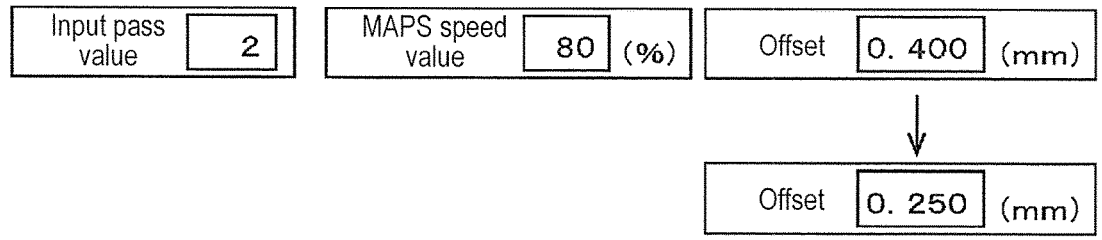
FIGS. 4A to 4C are views describing adjustment of an offset value in more detail.

Moreover, when the print conditions are changed, the adjustment may be insufficient if the offset value is simply adjusted by the proportional calculation. Therefore, in such a case, it is conceivable that the user inputs a new offset value according to the new print conditions. FIG. 4A shows a state in which the offset value is changed to 0.250 mm from the state shown in FIG. 3D. In this case, the offset value is changed to a value newly specified by the user by the feed correction value updating process.

Figure 4B:
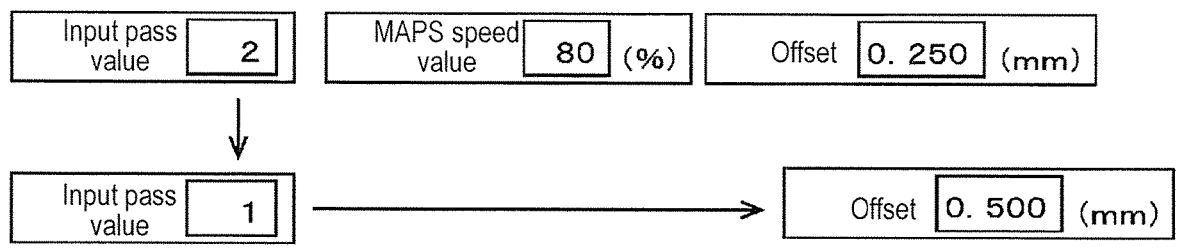
Figure 4C:
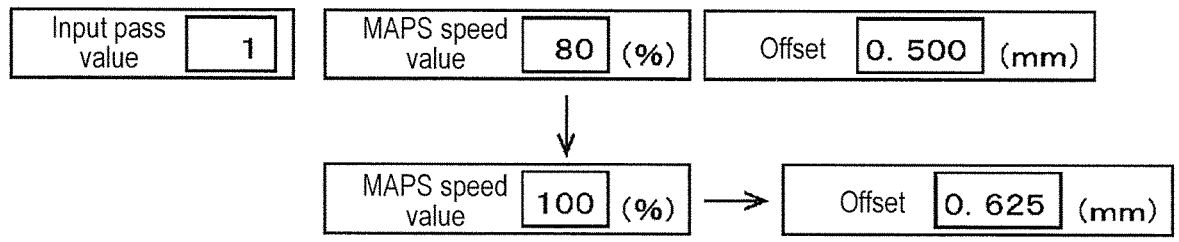

Furthermore, FIG. 4B shows a state in which the input pass value is changed to 1 from the state shown in FIG. 4A. In this case as well, the control unit 30 calculates a new basic movement amount based on the new input pass value and changes the offset value. As a result, in the case shown in FIG. 4B, the offset value is changed to 0.500 mm by the feed correction value updating process. Furthermore, FIG. 4C shows a state in which the MAPS speed value is changed to 100% from the state shown in FIG. 4B. In this case as well, the control unit 30 calculates a new basic movement amount based on the new MAPS speed value and changes the offset value. As a result, in the case shown in FIG. 4C, the offset value is changed to 0.625 mm by the feed correction value updating process.

Here, among the operations described above, for example, the operations shown in FIGS. 3B and 4A can be considered as examples of operations in which the offset value is newly set. In this case, the control unit 30 sets the feed amount based on the basic movement amount and the new offset value. Furthermore, for example, the operations shown in FIGS. 3C, 3D, 4B and 4C can be considered as, for example, examples of operations for a case in which the print conditions are further changed after the offset value is newly input. In this case, the control unit 30 adjusts the offset value according to the changed print conditions, and sets the feed amount based on the basic movement amount set according to the changed print conditions and the offset value adjusted according to the changed print conditions. With this configuration, for example, the offset value can be easily and appropriately input. Furthermore, for example, even if the print conditions are changed thereafter, the offset value can be appropriately adjusted according to the changed print conditions. As a result, for example, the feed amount can be appropriately corrected. Moreover, in this case, by adjusting the offset value according to the print conditions, the feed amount can be appropriately corrected even when there are many values that can be taken as the basic movement amount according to various print conditions. Therefore, according to the present example, the feed amount can be set appropriately with high accuracy.

Furthermore, as described above, in the present example, for example, it is conceivable to perform a printing operation based on a print job in which print conditions are set. Then, in this case, for example, it is conceivable that the printing device 10 continuously executes printing operations corresponding to a plurality of print jobs in which different print conditions are set. In this case, continuously executing printing operations corresponding to a plurality of print jobs means, for example, automatically and sequentially performing the printing operation corresponding to each print job by automatically and sequentially processing the plurality of print jobs supplied to the printing device 10. In such a case, since the set print conditions may differ for each print job, the print conditions may change as the print job changes.

On the other hand, in the present example, for example, the printing operation corresponding to each print job can be performed more appropriately by automatically adjusting the offset value according to the change in the print conditions. More specifically, in this case, for example, the offset value is adjusted in the control unit 30 according to the print conditions set in the next print job after the printed matter corresponding to one print job of the plurality of print jobs is printed and before the operation of printing the printed matter corresponding to the next print job is started. Furthermore, in this case, the control unit 30 further sets the feed amount based on the basic movement amount set according to the print conditions corresponding to the next print job and the offset value adjusted according to the print conditions. With this configuration, when printing operations corresponding to a plurality of print jobs are continuously executed, the feed amount corresponding to each print job can be appropriately set.

Furthermore, the offset value may be changed, for example, in the middle of the printing operation corresponding to one print job by the user observing the progress of printing. With this configuration, for example, when the user recognizes that the correction amount of the feed amount needs to be adjusted, the correction amount can be adjusted promptly. Furthermore, in this case, the correction operation with less error can be executed more appropriately by using the value as seen as the offset amount. More specifically, in this case, for example, a new offset value is input from the input unit 24 to the control unit 30 while printing the printed matter corresponding to one print job by the change in offset value by the user. Then, in this case, the control unit 30 sets a new feed amount based on the basic movement amount and the newly input offset value while printing the printed matter corresponding to one print job. The sub scan driving unit 20 causes the inkjet head 102 to perform the sub scan according to the new feed amount from the middle of printing the printed matter corresponding to one print job. With such a configuration, for example, the correction of the sub-scanning movement amount can be performed more flexibly and appropriately.

Figures 5A, 5B:
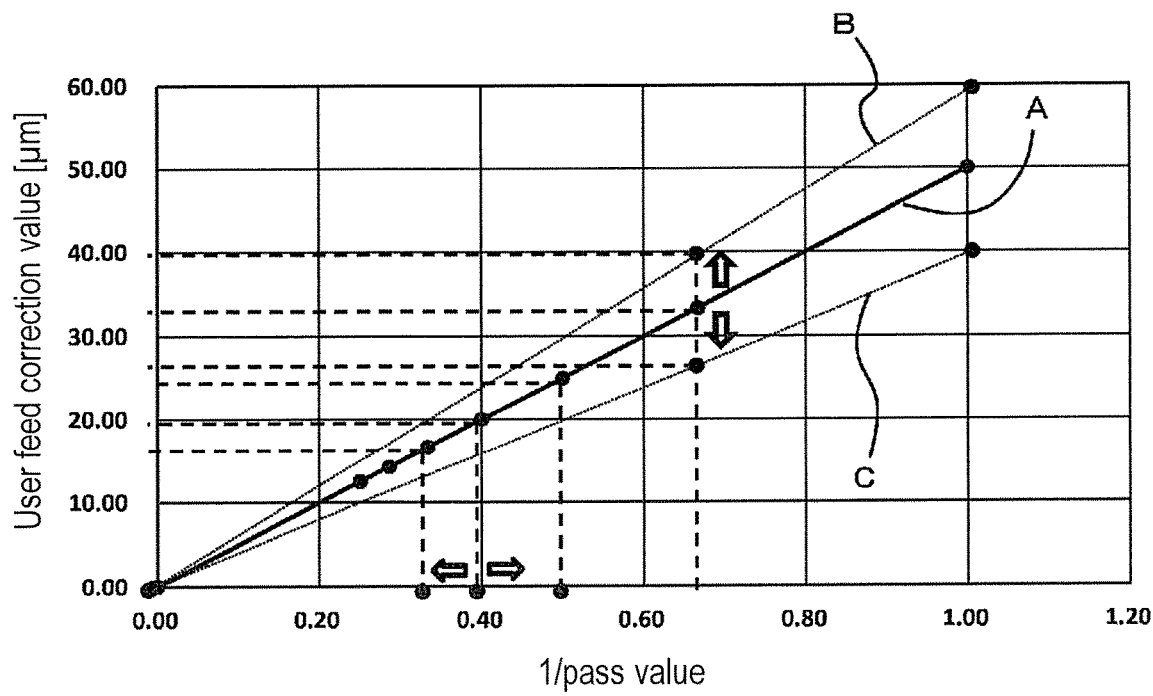
FIGS. 5A and 5B are views describing a method of correcting a feed amount in more detail.

Next, a specific example of a method of correcting the feed amount will be described in more detail. FIGS. 5A and 5B are views describing a method of correcting the feed amount in more detail. FIG. 5A is a table showing an example of the relationship between the odd pass, which is the pass number set according to the print condition, and the offset value, where the adjusted offset value is indicated in association with the pass number for a case where the offset value is adjusted according to the print conditions as described above.

Furthermore, in the table shown in FIG. 5A, the user feed correction value is a value corresponding to the adjusted offset value. Furthermore, as shown in the figure, the adjusted offset value is proportional to the reciprocal of the odd pass. The basic user feed correction value is a value corresponding to an offset value when the input pass value and the MAPS speed value are set to predetermined standard values. More specifically, in the table shown in FIG. 5A, the offset value converted when the input pass value is 1 and the MAPS speed value is 100% is shown as the basic user feed correction value.

FIG. 5B is a graph showing an example of the relationship between the 1/pass value, which is the reciprocal of the odd pass, and the user feed correction value, where an example of the relationship between the 1/pass value and the user feed correction value is shown for when the basic user feed correction value is 50 µm. As can be seen from the graph, in the present example, the user feed correction value is changed so as to be proportional to the 1/pass value. Furthermore, as can be understood from the above explanation, in the present example, the basic movement amount is proportional to the 1/pass value. Therefore, for example, it can also be considered to change the user feed correction value proportionately to the basic movement amount.

Further, in the graph of FIG. 5B, a case where the basic user feed correction value is 50 µm is indicated by a straight line denoted with a reference symbol A. In this case, for example, when a new value is input as the offset value and the user feed correction value is directly increased or decreased, the straight line indicating the relationship between the 1/pass value and the user feed correction value changes to, for example, a straight line denoted with a reference symbol B or C, as indicated by arrows in the up-down direction in the figure. Therefore, the operation of setting a new user correction value can also be considered as, for example, an operation of changing the slope of a straight line indicating the relationship between the 1/pass value and the user feed correction value.

In addition, when the print conditions change due to change in the input pass value or the MAPS speed value, the value of 1/pass value changes as the pass number (odd pass) changes. In this case, in the straight line showing the relationship between the 1/pass value and the user feed correction value, the position of a point corresponding to the print condition changes to a position smaller than or a position larger than the 1/pass value, as indicated by arrows in the left-right direction in the figure. Accompanying therewith, the corresponding user feed correction value also changes. As a result, the user feed correction value is adjusted to follow the print conditions. Therefore, according to the present example, for example, in a system in which the required correction amount changes in a proportional relationship depending on the size of the feed amount, appropriate correction can be performed for each feed amount value.

More specifically, as for the method of adjusting (setting) the user feed correction value according to the print conditions, for example, with the input pass value input on the screen shown in FIG. 2A as pass, the MAPS speed as mapsspd, the value of offset value as feedofs, and furthermore, the input pass value and MAPS speed value used at the time of the previous calculation of the offset value as svpass and sv_mapsspd, the new offset value=feedofs×(sv_pass/(sv_mapsspd/100))/(pass/(mapsspd/100)) can be calculated. With this configuration, for example, the offset value used as the user feed correction value can be appropriately adjusted.

Next, supplementary description and the like will be made regarding each configuration described above. As described above, in the present example, as the user feed correction value, an offset value set, in which the value as seen by the user under arbitrary print conditions, is used. On the other hand, when only considering that the correction value is set by the user, for example, it is conceivable to have the user specify the amount of correction according to a specific print condition as in the basic user feed correction value described above. In this case as well, the feed amount can be adjusted by automatically adjusting the correction value so as to be proportional to the change in the feed amount. However, in this case, it is necessary for the user to input the amount of deviation of the feed amount recognized by the user in the print result after performing conversion according to a specific print condition. More specifically, in this case, a configuration in which the correction value is retained as a value at the time of a specific print condition is adopted, and thus for example, if the correction value when the pass number is 1 is retained, even if the user recognizes the deviation amount of the feed amount when printing with actually 4 passes as a certain value (e.g., 200 µm), a value different from the recognized deviation amount needs to be input in view of the difference in feed amount due to the difference in pass number to correct the deviation amount. For example, when the correction value is simply proportional to the feed amount, it is necessary to input a value converted to 50 µm, which is ¼ of the above value (200 µm), as the correction value to be input. Then, in such a case, the user's labor increases because the calculation for conversion is required. In addition, an error may occur during conversion, and correct correction may not be performed. Furthermore, it may be difficult to make a quick change when the correction value is to be changed in the middle of the printing operation. On the other hand, in the present example, as described above, the occurrence of these problems can be appropriately prevented by using the offset value, in which the value as seen by the user is set, as the correction value.

Furthermore, as described above, in the present example, the feed amount is set by further using the system feed correction value in addition to the user feed correction value input as the offset value. Then, in this case, it is conceivable to change the total correction value of the user feed correction value and the system feed correction value so as to be proportional to the 1/pass value. More specifically, for the total correction value that reflects the offset value set by the user for a specific print condition, a case where the total correction amount is 300 µm when the input pass value is 2 is assumed, where if only the input pass value is changed to 1 without changing the MAPS speed value, the total correction value is considered to be adjusted to 600 µm. With this configuration, for example, the feed amount can be appropriately corrected by further using the system feed correction value.

Furthermore, as described above, in the present example, the correction amount of the sub-scanning movement amount can be appropriately adjusted based on the determination of the user who confirmed the print result by using the offset value as the user feed correction value. On the other hand, for example, if the feed amount in the sub scan is measured by using a linear scale or the like and automatically corrected as appropriate, it may seem that the feed amount can be appropriately corrected. However, in an actual printing environment, banding may occur due to the influence of a minute error or the like even if the correct feed amount can be realized by the measurement result of the linear scale or the like. Therefore, when performing printing more appropriately with high accuracy, it is more preferable that the user actually confirms the print result and corrects the feed amount as in the present example. Moreover, depending on the conditions required for printing, the offset value may be input by a system that automatically detects the required correction amount for the feed amount, and may not necessarily be manually input by the user. More specifically, in this case, for example, it is conceivable to detect the required correction amount by imaging an image of the print result with a camera or the like and confirming the presence or absence of banding by image processing or the like.

Next, the correction coefficient used for correcting the feed amount, the operation of setting the feed amount in the control unit 30, and the like will be described in more detail. In the present example, the control unit 30 sets a basic feed amount equivalent to the feed amount before correction based on the print conditions. In this case, the basic feed amount is an example of the basic movement amount which is the basic movement amount set according to the print conditions. Furthermore, in this case, the control unit 30 uses, for example, the condition specified in the print job indicating the image to be printed as the print condition. Furthermore, as the print conditions, conditions specified by the user may be used. Moreover, in the present example, the input pass value and the MAPS speed value are used as the print conditions used for setting the basic feed amount.

In the present example, the control unit 30 sets the pass number and the basic feed amount based on the input pass value and the MAPS speed value specified as the print conditions. In this case, the pass number is the odd pass described above. Furthermore, the control unit 30 further sets the basic feed amount based on the pass number and the nozzle length of the inkjet head. More specifically, in the present example, a value obtained by dividing the nozzle length of the inkjet head by the pass number is set as the basic feed amount. Furthermore, as described above, in the present example, the pass number is calculated according to the input pass value and the MAPS speed value, so that an arbitrary value can be set at pitches of 0.01. Therefore, various values can be set within the range of less than or equal to the nozzle length for the value that can be taken as the basic movement amount.

Further, the control unit 30 sets the feed amount actually used during the sub scan by performing correction on the basic feed amount calculated in this way. In this case, the operation of performing correction on the basic feed amount can be considered as the operation of correcting the feed amount. Furthermore, in this case, the control unit 30 calculates the calculated correction value based on the correction coefficient stored in the storage 22, and corrects the basic feed amount by using the calculated correction value. Moreover, in this case, for example, the feed amount in which the basic feed amount is corrected is calculated by adding the calculated correction value to the basic feed amount.

Figures 6A, 6B:
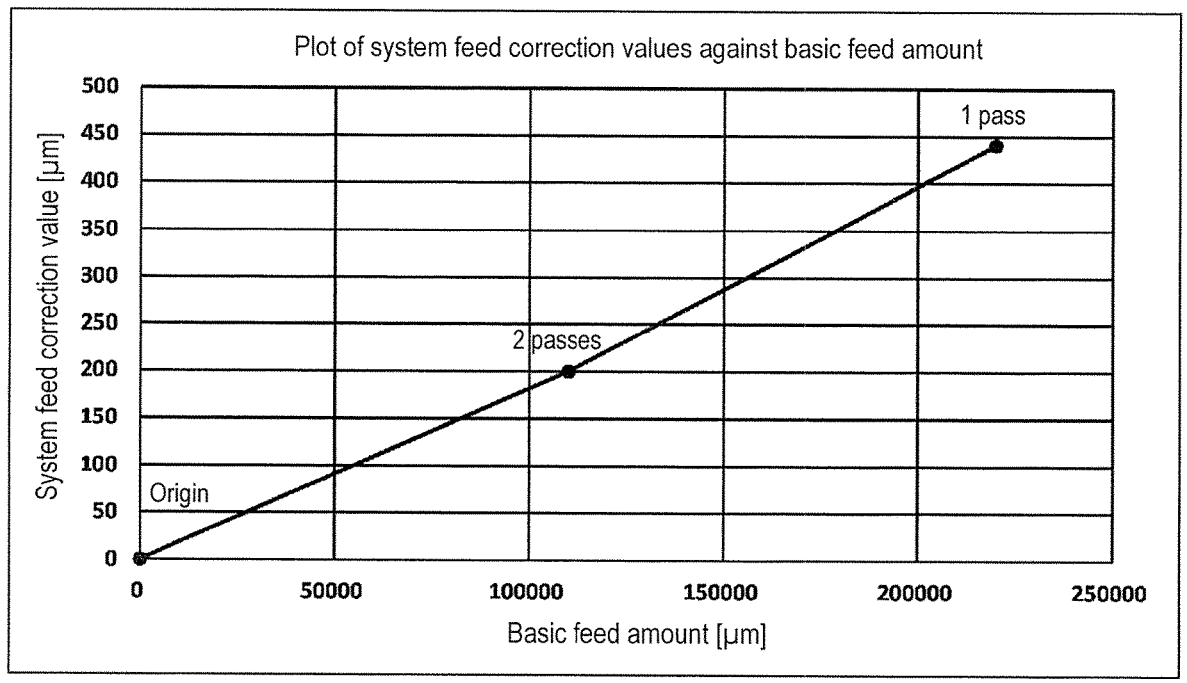
FIGS. 6A and 6B are views describing a method of calculating a calculated correction value.
Figure 7:
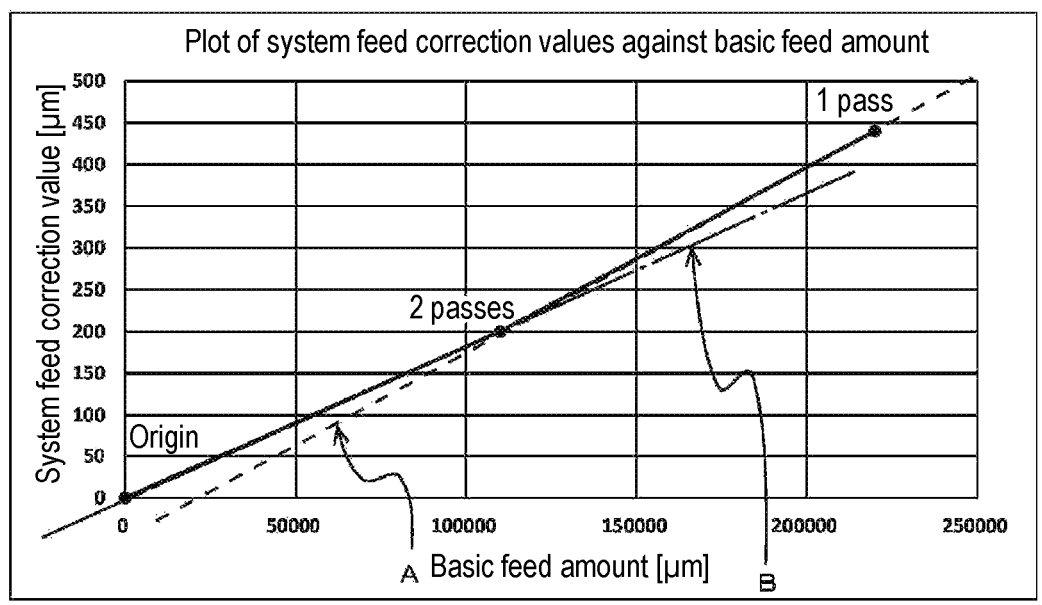
FIG. 7 is a view describing a method of calculating a calculated correction value.

Next, a method of calculating the calculated correction value and the like will be described in more detail. FIGS. 6A, 6B and 7 are views describing a method of calculating the calculated correction value. As described above, in the present example, the control unit 30 calculates the calculated correction value based on the correction coefficient stored in the storage 22. Furthermore, in this case, the storage 22 stores, for example, a correction coefficient set at the time of shipment or adjustment of the printing device 10. Therefore, it can be considered that the calculated correction value is calculated so as to indicate the correction amount set in advance in the printing device 10. Furthermore, in this case, the calculated correction value can be considered as an example of the system feed correction value set in advance in the printing device 10. The system feed correction value is, for example, a correction value prepared in advance by the manufacturer of the printing device 10 or the provider of services related to the printing device 10. More specifically, in the present example, as the correction coefficient, for example, a coefficient that associates the basic feed amount and the correction value to be set for the basic feed amount is used.

FIG. 6A shows an example of the relationship between the specific basic feed amount associated with the correction coefficient and the correction value (system feed correction value). In this case, the specific basic feed amount associated with the correction coefficient is, for example, the basic feed amount corresponding to the boundary of the range of the basic feed amount described later. FIG. 6B is a graph showing the relationship between the basic feed amount and the correction value shown in FIG. 6A, and shows a state in which points corresponding to each basic feed amount shown in FIG. 6A are plotted and each point is connected by a straight line (line segment).

In the present example, as the specific basic feed amount, the basic feed amount when the pass number is 0, 1, and 2 is used. In this case, when the pass number is 0, a virtual condition for using as the origin used when calculating the calculated correction value is shown. Furthermore, as the correction value corresponding to each basic feed amount, a value to be set as a system feed correction value is used. It is conceivable that this correction value can be obtained by, for example, actual measurement and the like performed by printing the test chart at the time of shipment or adjustment of the printing device 10. Furthermore, 0 is set as the correction value when the pass number is 0.

Here, when considering the correction values to be used for correcting the basic feed amount for various basic feed amounts, the relationship between the basic feed amount and the correction value is assumed to change linearly within a range the error does not exceed a certain allowable amount. Furthermore, as will be described in more detail later, the inventor of the present application considered the basic feed amount separately for two ranges, for when the pass number is within the range of 1 to 2 and for other cases in the case of a normal inkjet printer, and found that the above linear relationship appropriately holds in each range. Then, in this case, for the basic feed amount other than the basic feed amount shown in FIG. 6A, a correction value corresponding to each basic feed amount can be obtained based on the relationship indicated by the straight line shown in FIG. 6B. Furthermore, in this case, the correction value thus obtained can be used as the calculated correction value described above.

FIG. 7 is a view describing the straight lines in the graph of FIG. 6B in more detail, and shows a graph obtained by extending each straight line shown in FIG. 6B. More specifically, in the graph of FIG. 7, the straight line corresponding to the basic feed amount when the pass number is 1 to 2 in FIG. 6B is indicated with a reference symbol A, and extended using a broken line. In addition, the straight line corresponding to the basic feed amount when the pass number is other than in the range of 1 to 2 is indicated with a reference symbol B, and extended by using a one dot chain line.

Furthermore, in the present example, the range of the basic feed amount corresponding to a case where the pass number is within the range of 1 to 2 is an example of a first range. Moreover, among the basic feed amounts within this range, the basic feed amount when the pass number is 1 becomes equal to the nozzle length in the inkjet head. Therefore, the first range can be considered as, for example, a range including a case where the nozzle length and the basic feed amount are equal to each other. Furthermore, in the present example, when referring to the pass number being within the range of 1 to 2, this means that the pass number is in the range of greater than or equal to 1 or less than 2. In a modified example for the method of setting the range, the case where the pass number is equal to 2 may be included in the first range.

The range of the basic feed amount corresponding to the basic feed amount when the pass number is other than in the range of 1 to 2 is an example of a second range. In this case, the second range is a range in which the basic feed amount is smaller than the first range.

Furthermore, the range in which the basic feed amount is smaller than the first range means that the basic feed amount included in that range is smaller than the basic feed amount included in the first range.

Furthermore, in the present example, the basic feed amount when the pass number is 2 is an example of a predetermined movement amount smaller than the nozzle length. In this case, the second range can be considered as, for example, a range including all basic feed amounts less than or equal to or less than such a predetermined movement amount. Furthermore, the first range described above can be considered as, for example, a range including all basic feed amounts larger than a predetermined movement amount. Moreover, in the present example, the predetermined movement amount is a movement amount equal to half of the nozzle length.

Therefore, in the present example, the range including all the basic feed amounts corresponding to when the pass number is greater than or equal to 2 is an example of the second range. In a modified example for the method of setting the range, the range including all the basic feed amounts less than the basic feed amount when the pass number is 2 without including the case where the pass number is equal to 2 may be considered as the second range.

Furthermore, in the present example, the storage 22 stores a coefficient indicating a straight line in the graph as the correction coefficient. In this case, the coefficient indicating the straight line is, for example, a parameter indicating the slope and intercept of the straight line. Furthermore, as the correction coefficient, the parameter for calculating the slope or the intercept may be stored instead of storing the parameter directly indicating the slope or the intercept. More specifically, in this case, for example, as with each value shown in FIG. 6A, a specific print condition may be associated with the correction value and stored as a correction coefficient. In this case, it is conceivable to use at least one of the pass number and the basic feed amount as the print condition.

More specifically, in the present example, the storage 22 stores parameters indicating the slope and the intercept of each of the two straight lines denoted with symbols A and B in the figure as the correction coefficients. In this case, the parameter corresponding to the straight line denoted with the reference symbol A is an example of a first correction coefficient. The first correction coefficient is a correction coefficient used when the basic feed amount is within the first range. The parameter corresponding to the straight line denoted with the reference symbol B is an example of a second correction coefficient. The second correction coefficient is a correction coefficient used when the basic feed amount is within the second range.

As described above, in the present example, the calculated correction value is calculated using the straight line indicated by these correction coefficients. Therefore, the correction coefficient can be considered as, for example, a coefficient indicating a linear function that associates the basic feed amount with the calculated correction value. Furthermore, as apparent from the figures and the like, in the present example, the straight line denoted with the reference symbol A and the straight line denoted with the reference symbol B have different slopes and intercepts. Therefore, the correction coefficient corresponding to the straight line with the reference symbol B and the correction coefficient corresponding to the straight line with the reference symbol A are coefficients different from each other.

More specifically, in the present example, as the correction coefficient indicating the straight line with the reference symbol A, the coefficient indicating that the calculated correction value corresponding to the basic feed amount linearly changes within the range of the basic feed amount corresponding to the pass number of 1 to 2 is used. In this case, the linear change of the calculated correction value corresponding to the basic feed amount means that the relationship between the basic feed amount and the calculated correction value becomes a linear function. More specifically, in this example, the linear function is a function corresponding to a straight line that does not pass through the origin, as shown in the figure.

Furthermore, when the slope and intercept of the straight line with reference symbol A are obtained using the values shown in FIG. 6A, the slope is 0.002182 and the intercept is −40. Therefore, when the basic feed amount is x (μm) and the calculated correction value (system feed correction value) is y (μm), the relationship between x and y is as shown by y=0.002182x−40.

Furthermore, in the present example, as the correction coefficient indicating the straight line with the reference symbol B, a coefficient indicating that the calculated correction value is calculated proportionately to the basic feed amount is used. The calculation of the calculated correction value proportionately to the basic feed amount means that, for example, the linear function that associates the basic feed amount with the calculated correction value becomes a function indicating a straight line that passes through the origin. Moreover, in this case, as described above, the slope of the straight line with the reference symbol B is different from the slope of the straight line with the reference symbol A.

Furthermore, when the slope and intercept of the straight line with reference symbol B are obtained using the values shown in FIG. 6A, the slope becomes 0.001818 and the intercept becomes 0. Therefore, the relationship between the basic feed amount x (μm) and the calculated correction value (system feed correction value) y (μμm) is as shown by y=0.001818x.

Figure 8A:
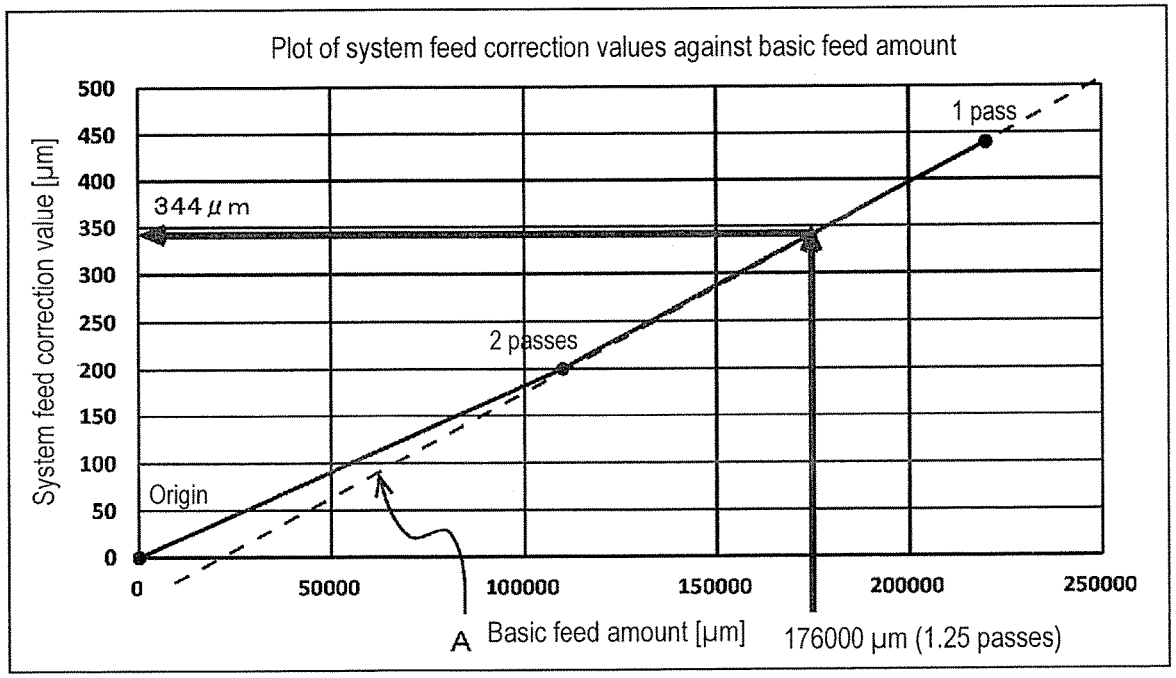
FIGS. 8A and 8B are views showing an example of an operation of calculating a calculated correction value.
Figure 8B:
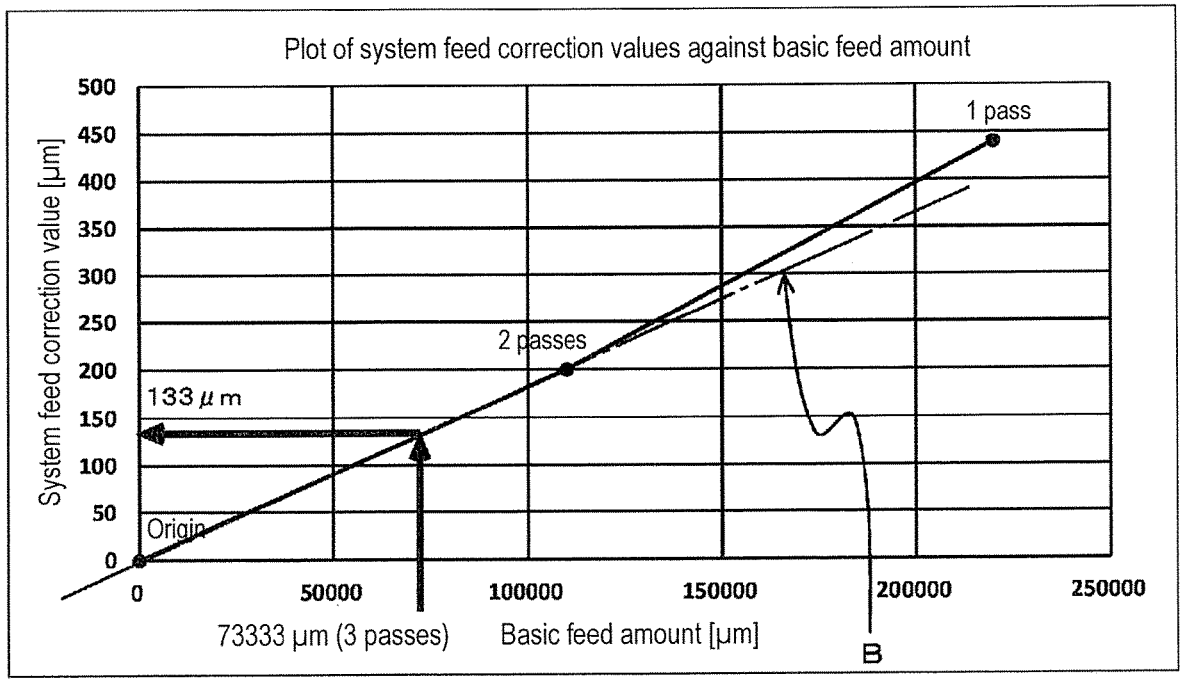

Next, the operation of calculating the calculated correction value will be described in more detail. FIGS. 8A and 8B show an example of the operation of calculating the calculated correction value. FIG. 8A shows an example of a method of calculating the calculated correction value when the corresponding pass number is within the range of 1 to 2. FIG. 8B shows an example of a method of calculating the calculated correction value when the corresponding pass number is greater than or equal to 2.

As explained above, in the present example, the calculated correction value is calculated by using the relationship shown by the straight line that associates the basic feed amount with the calculated correction value. In this case, the relationship shown by the straight line is the relationship between x and y shown above. Furthermore, in this case, the relationship corresponding to different straight lines is used for the basic feed amount in which the corresponding pass number is 1 to 2 and for the basic feed amount in which the corresponding pass number is greater than or equal to 2.

More specifically, in a case for the basic feed amount in which the corresponding pass number is within the range of 1 to 2, the control unit 30 calculates the calculated correction value corresponding to the basic feed amount according to the relationship shown by the straight line with reference symbol A, as shown in FIG. 8A. In this case, the straight line with the reference symbol A is the straight line with the reference symbol A described above with reference to FIG. 7. More specifically, for example, considering a case where the pass number is 1.25 as an example of the pass number in the range of 1 to 2, the corresponding basic feed amount is 192,500 μm. In this case, when this value is substituted for x in the relationship shown by a straight line with the reference symbol A, the value of y becomes 380 μm. Therefore, 380 μm is calculated as the calculated correction value for this case.

Moreover, in a case for the basic feed amount in which the corresponding pass number is greater than or equal to 2, the control unit 30 calculates the calculated correction value corresponding to the basic feed amount according to the relationship shown by the straight line with reference symbol B, as shown in FIG. 8B. In this case, the straight line with the reference symbol B is the straight line with the reference symbol B described above with reference to FIG. 7. More specifically, for example, considering a case where the pass number is 3 as an example of the pass number greater than or equal to 2, the corresponding basic feed amount is 73,333 μm. In this case, when this value is substituted for x in the relationship shown by a straight line with the reference symbol B, the value of y becomes 133 μm. Therefore, 133 μm is calculated as the calculated correction value for this case.

Thus, according to the present example, for example, the calculated correction value can be appropriately calculated based on the correction coefficient corresponding to the straight line with the reference symbol A with respect to the basic feed amount in which the corresponding pass number is within the range of 1 to 2. Furthermore, the calculated correction value can be appropriately calculated based on the correction coefficient corresponding to the straight line with the reference symbol B for the basic feed amount in which the corresponding pass number is greater than or equal to 2. Thus, for example, the corresponding calculated correction value can be appropriately calculated for an arbitrary basic feed amount. Therefore, according to the present example, for example, even when there are many values that can be taken as the basic feed amount, it is possible to appropriately correct the feed amount with high accuracy and set the feed amount appropriately. Moreover, in this case, as apparent from the description made above and the like, since only a limited number of correction coefficients need to be prepared, the feed amount can be appropriately corrected by using only a small number of correction parameters.

Next, supplementary description and the like will be made regarding each configuration described above. As described above, the printing device 10 of the present example is a system that can take an arbitrary feed amount by setting various values as the MAPS speed value. Furthermore, in this case, the system is such that the correction value corresponding to an arbitrary feed amount is automatically and proportionally calculated and applied by calculating the calculated correction value corresponding to the change in the basic feed amount. Therefore, according to the present example, the correction value can be appropriately and automatically adjusted even when the basic feed amount changes variously including the value corresponding to the non-integer pass number, and the like. Furthermore, such a configuration can be considered as, for example, a configuration in which the correction value of the feed amount is changed according to the print conditions.

Furthermore, as described above, in the present example, for the correction performed when setting the feed amount, the values the basic feed amount can take are divided into a plurality of ranges, and different correction coefficients are used for each range. Regarding this point, when considering to perform the correction more easily, for example, it can be said that it is preferable to perform the correction using only the correction coefficient indicating one type of straight line.

However, for example, when the nozzle length becomes large due to an increase in the size of the inkjet head or the like, the error may exceed the allowable range if the correction is performed using only the correction coefficient indicating one type of straight line. More specifically, when only the correction coefficient indicating one type of straight line is used, it is conceivable to use the correction value proportional to the basic feed amount. Furthermore, the method of such correction can be considered as, for example, a configuration in which the correction value is calculated using only one proportional coefficient. When the correction is performed in this way, it is conceivable that when the nozzle length becomes large, a difference larger than the distance between the sub-scanning dots occurs with respect to the ideal correction value in any of the feed amounts. In this case, the distance between the sub-scanning dots is the inter-dot distance corresponding to the resolution in the sub-scanning direction set according to the print conditions. In this case, for example, when a correction value for correctly setting the feed amount corresponding to each basic feed amount is defined as an ideal correction value, and a correction value when the calculated correction value is set proportionately to the basic feed amount using only one proportional coefficient is defined as a simple proportional correction value, it can be considered that if one proportional coefficient is set so that the ideal correction value and the simple proportional correction value become equal with respect to any of the basic feed amounts, the difference between the ideal correction value corresponding to such basic feed amount and the simple proportional correction value becomes larger than the distance between the sub-scanning dots for other basic feed amounts. If such an error occurs, when a feed amount with a larger error is used, banding such as white streaks or black streaks may occur even if the feed amount is corrected. As a result, it is considered difficult to perform printing with high quality.

Regarding the conditions under which such an error occurs, for example, a plurality of straight lines such as straight lines with reference symbols A and B in FIG. 7 and the like may be considered, and when each straight line is extended, it can be assumed that at the position of any of the basic feed amounts, an error exceeding the distance between the sub-scanning dots may occur between the calculated correction value indicated with the straight line A and the calculated correction value indicated with the straight line B. Furthermore, regarding such a condition, for example, when the basic feed amount is equal to the nozzle length, the calculated correction value calculated based on the correction coefficient corresponding to the straight line A is set as the first value, and the value when the correction value is calculated according to the proportional relationship indicated by the correction coefficient corresponding to the straight line B is set as the second value, it can be considered that the difference between the first value and the second value becomes larger than the distance between the sub-scanning dots. In such a case, for example, if the sub-scanning movement amount is corrected using only one type of correction coefficient, it is conceivable that an error exceeding the distance between the sub-scanning dots occur in the feed amount after correction when for example, the basic feed amount becomes equal to the nozzle length, or the basic feed amount becomes half of the nozzle length.

On the other hand, in the present example, the occurrence of such an error can be appropriately prevented by dividing the values that may be taken by the basic feed amount into a plurality of ranges and using different correction coefficients for each range. Furthermore, for example, the feed amount thus can be corrected more appropriately with higher accuracy. Therefore, according to the present example, for example, even in a system in which the proportional coefficient of the feed correction value changes depending on the magnitude of the feed amount, the feed amount can be appropriately corrected for each range of the feed amount. In this case, the system in which the proportional coefficient of the feed correction value changes depending on the magnitude of the feed amount is, for example, a system in which a difference occurs in the proportional coefficient of the feed correction between when the feed amount is large and when the feed amount is small in a case where the calculation of the correction value is attempted with a simple proportional relationship. Furthermore, such a system can be considered as a system in which an appropriate correction cannot be performed on all feed amounts with only one proportional coefficient. Moreover, regarding the configuration of the present example, for example, it can be considered that it can be particularly suitably used when the above error occurs when only the correction coefficient indicating one type of straight line is used.

In addition, as described above, in the present example, the values that may be taken by the basic feed amount is divided into two ranges, a range in which the corresponding pass number is 1 to 2 and another range. Regarding this point, for example, when the size of the inkjet head is further increased or the distance between the sub-scanning dots is further reduced, it can be considered preferable to further divide the values that may be taken by the basic feed amount into more ranges, and use different correction coefficients for each range. However, when considering the configuration of an inkjet printer that is currently being generally used, usually, the correction can be appropriately performed with high accuracy by dividing the values that may be taken by the basic feed amount into two ranges as in the present example. More specifically, for example, when the nozzle length is less than or equal to about 500 mm (e.g., about 100 to 500 mm) and the resolution of printing in the sub-scanning direction is less than or equal to about 1200 dpi (e.g., about 300 to 1200 dpi), the correction can be appropriately performed with high accuracy by dividing the values that may be taken by the basic feed amount into two ranges. Furthermore, when the nozzle length is less than or equal to about 300 mm (e.g., about 100 to 300 mm) and the resolution of printing in the sub-scanning direction is less than or equal to about 600 dpi (e.g., about 300 to 600 dpi), the correction can be appropriately performed with high accuracy by dividing the values that may be taken by the basic feed amount into two ranges.

Furthermore, as described above, in the present example, the storage 22 stores, for example, parameters indicating the slope and intercept of a straight line as correction coefficients. As such a parameter, for example, it is conceivable to directly store the values of the slope and the intercept. In this case, the values of slope and intercept stored in the storage 22 can also be considered to be, for example, a proportional coefficient for automatically proportionally calculating the feed correction value corresponding to each basic feed amount between specific basic feed amounts. When referring to between the specific basic feed amount, for example, this is the range of the basic feed amount in which the corresponding pass number is 1 to 2, or the range of the basic feed amount in which the corresponding pass number is greater than or equal to 2.

Furthermore, as the correction coefficient, instead of directly storing the values of slope and intercept of the straight line, other numerical values capable of calculating these values may be stored. More specifically, in this case, for example, a specific basic feed amount and a correction value corresponding to such basic feed amount, such as the basic feed amount and the correction value (system feed correction value) shown in FIG. 6A may be stored as a correction coefficient. In this case, the correction coefficient can be considered as, for example, a unique feed correction value that serves as a reference when individually calculating the proportional coefficient for a specific basic feed amount. Furthermore, in this case, when calculating the calculated correction value, the proportional coefficient calculation process for calculating the parameter indicating the straight line corresponding to the range including the basic feed amount is performed, and the result is used to correct the feed amount. Moreover, the system that performs such proportional coefficient calculation process can be considered as, for example, a system that automatically calculates the proportional coefficient for automatically proportionally calculating the feed correction value corresponding to each basic feed amount between the specific basic feed amounts from the unique feed correction value serving as a reference of such a calculation.

Furthermore, in the above description, regarding the correction value used when setting the feed amount, a case where the system feed correction value preset in the printing device 10 is mainly used has been described. In this case, as described above, the calculated correction value calculated in this example can be considered as a system feed correction value. Moreover, as the correction value used when setting the feed amount, for example, a user feed correction value, which is a correction value set by the user's specification, may be further used in addition to the system feed correction value. In this case, as the user feed correction value, for example, it is conceivable to use an offset value for adjusting the feed amount, or the like. Furthermore, regarding this offset value, for example, it is conceivable that the user who confirms the result of the printing actually performed by the printing device 10 specifies to reduce the deviation of the feed amount. Furthermore, in this case, it is conceivable that the printing device 10 manages the user feed correction value specified by the user in association with the print conditions. Then, when the print conditions are changed thereafter, it is conceivable that the offset value is also adjusted according to the change in the basic feed amount caused by the change in the print conditions. In this case, for example, it is conceivable to adjust the offset value so as to be proportional to the basic feed amount. With this configuration, the user feed correction value can be appropriately changed by following the change in the print conditions.

Further, in this case, it is conceivable to adjust the offset value by proportional calculation using, for example, the slope of the straight line used when calculating the calculated correction value as the proportional coefficient according to the range including the basic feed amount. With this configuration, for example, the user feed correction value can be appropriately changed according to the change in the system feed correction value. Furthermore, the offset value specified as the user feed correction value is usually considered to be a value smaller than the calculated correction value used as the system feed correction value. Therefore, the offset value can be appropriately adjusted with high accuracy without using different proportional coefficients for each range of the basic feed amount. Thus, the offset value may be adjusted with a simple proportional calculation using only one proportional coefficient for the entire range of the basic feed amount. In this case, the simple proportional calculation is, for example, to make an adjustment using the relationship corresponding to the straight line passing through the origin.

INDUSTRIAL APPLICABILITY

The present invention can be suitably used in, for example, a printing device.

The invention claimed is:

1. A printing device that performs printing on a medium, the printing device comprising:
   an inkjet head, configured to eject ink to the medium;
   a main scan driving unit, configured to cause the inkjet head to perform a main scan of ejecting ink while moving relative to the medium in a main scanning direction set in advance;
   a sub scan driving unit moves the inkjet head relative to the medium in a sub-scanning direction orthogonal to the main scanning direction for performing a sub scan;
   a movement amount setting unit, configured to set a sub-scanning movement amount, which is a distance for moving the inkjet head in the sub-scanning direction relative to the medium in the sub scan; and
   an input unit, configured to input an input correction value input to the movement amount setting unit as a correction value used for correcting the sub-scanning movement amount to the movement amount setting unit,
   wherein the movement amount setting unit sets the sub-scanning movement amount based on a basic movement amount, which is a basic movement amount set according to print conditions, and the input correction value input by the input unit,
   the input unit inputs, as the input correction value, a value indicating a distance for increasing or decreasing the sub-scanning movement amount under the print conditions set at the time of inputting the input correction value,
   when the input correction value is newly input, the movement amount setting unit sets the sub-scanning movement amount based on the basic movement amount and the input correction value that is newly input, and
   when the print conditions are changed after the input correction value is newly input, the movement amount setting unit adjusts the input correction value according to the changed print conditions, and sets the sub-scanning movement amount based on the basic movement amount set according to the changed print conditions and the input correction value adjusted according to the changed print conditions;

wherein the printing device is configured to execute a printing operation based on one print job to which print conditions are set, when the input unit is configured to input a new input correction value while a printed matter is being printed corresponding to the one print job, the movement amount setting unit sets a new sub-scanning movement amount based on the basic movement amount and the input correction value that is newly input, and the sub scan driving unit is configured to cause the inkjet head to perform the sub scan according to the new sub-scanning movement amount in a middle of the printing of the printed matter corresponding to the one print job.

2. The printing device as set forth in claim 1, wherein the input unit inputs a user feed correction value, which is a value specified by a user, as the input correction value.

3. The printing device as set forth in claim 2, wherein the movement amount setting unit further uses a system feed correction value, which is a correction value set according to the print conditions based on parameters set in advance in the printing device, and sets the sub-scanning movement amount based on the basic movement amount, the user feed correction value, and the system feed correction value.

4. The printing device as set forth in claim 2, wherein the input unit accepts from a user input of an offset value, which is a value indicating as it is a distance for changing the sub-scanning movement amount under the print conditions set at the time of inputting the input correction value, as a value specified by the user.

5. The printing device as set forth in claim 1, wherein the inkjet head has a nozzle row in which a plurality of nozzles is arranged with positions in the sub-scanning direction displaced from each other, as a print condition, at least a pass number indicating an average number of main scans performed for each position in a printing range on the medium is set in the movement amount setting unit, and the basic movement amount indicates a value obtained by dividing a nozzle length, which is the width of the nozzle row of the inkjet head in the sub-scanning direction, by the pass number.

6. The printing device as set forth in claim 5, wherein a plurality of types of values including non-integer values is capable of being set as the pass number.

7. The printing device as set forth in claim 6, wherein as the non-integer value, a value having a pitch size of at least less than or equal to 0.25 is capable of being set.

8. The printing device as set forth in claim 1, wherein the printing device continuously executes a printing operation corresponding to a plurality of print jobs set with different print conditions from each other, and after a printed matter corresponding to one of the plurality of print jobs is printed, and before an operation of printing a printed matter corresponding to the next print job is started, the movement amount setting unit adjusts the input correction value according to the print conditions set in the next print job, and sets the sub-scanning movement amount based on the basic movement amount set according to the print conditions corresponding to the next print job and the input correction value adjusted according to the print conditions.

9. A printing device that performs printing on a medium, the printing device comprising:

an inkjet head, configured to eject ink to the medium;

a main scan driving unit, configured to cause the inkjet head to perform a main scan of ejecting ink while moving relative to the medium in a main scanning direction set in advance;

a sub scan driving unit moves the inkjet head relative to the medium in a sub-scanning direction orthogonal to the main scanning direction for performing a sub scan;

a movement amount setting unit, configured to set a sub-scanning movement amount, which is a distance for moving the inkjet head in the sub-scanning direction relative to the medium in the sub scan; and a correction coefficient storage, configured to store a correction coefficient, which is a coefficient used to calculate a calculated correction value calculated as a correction value used to correct the sub-scanning movement amount, wherein the movement amount setting unit sets the sub-scanning movement amount based on a basic movement amount, which is a basic movement amount set according to print conditions, and the calculated correction value;

the correction coefficient storage stores, as the correction coefficient, at least:
  a first correction coefficient used when the basic movement amount is within a first range, and
  a second correction coefficient used when the basic movement amount is within a second range smaller than the first range, when the basic movement amount is within the first range, the movement amount setting unit calculates the calculated correction value based on the basic movement amount and the first correction coefficient, and when the basic movement amount is within the second range, the movement amount setting unit calculates the calculated correction value based on the basic movement amount and the second correction coefficient.

10. The printing device as set forth in claim 9, wherein inkjet head has a nozzle row in which a plurality of nozzles is arranged with positions in the sub-scanning direction displaced from each other, the first range is a range including a case where a nozzle length, which is a width of the nozzle row of the inkjet head in the sub-scanning direction, and the basic movement amount are equal, the second range is a range including all the basic movement amounts of less than or equal to or less than a predetermined movement amount smaller than the nozzle length; and the second correction coefficient is a coefficient indicating that the calculated correction value is calculated proportionately to the basic movement amount.

11. The printing device as set forth in claim 10, wherein the predetermined movement amount is a movement amount equal to half of the nozzle length, the first range is a range including all the basic movement amounts larger than the predetermined movement amount, and the first correction coefficient is a coefficient indicating that the calculated correction value corresponding to the basic movement amount linearly changes between the basic movement amount equal to half of the nozzle length and the basic movement amount equal to the nozzle length.

12. The printing device as set forth in claim 11, wherein a slope in the linear relationship indicated by the first correction coefficient is different from a slope in the proportional relationship indicated by the second correction coefficient.

13. The printing device as set forth in claim 10, wherein in a case where an inter-dot distance corresponding to the resolution in the sub-scanning direction set according to the print conditions is defined as a distance between sub-scanning dots, and when the basic movement amount is equal to the nozzle length, the calculated correction value calculated based on the first correction coefficient is set as a first value, and a value when a correction value is calculated according to a proportional relationship indicated by the second correction coefficient is set as a second value, a difference between the first value and the second value is larger than the distance between the sub-scanning dots.

14. The printing device as set forth in claim 9, wherein in a case where an inter-dot distance corresponding to the resolution in the sub-scanning direction set according to the print conditions is defined as a distance between sub-scanning dots, a correction value for correctly setting the sub-scanning movement amount corresponding to each basic movement amount is defined as an ideal correction value, and a correction value when the calculated correction value is set proportionately to the basic movement amount using only one proportional coefficient is defined as a simple proportional correction value, when one proportional coefficient is set so that the ideal correction value and the simple proportional correction value become equal with respect to any of the basic movement amounts, a difference between the ideal correction value corresponding to the basic movement amount and the simple proportional correction value becomes larger than the distance between the sub-scanning dots with respect to the other basic movement amounts.

15. The printing device as set forth in claim 9, wherein as a print condition, at least a pass number indicating an average number of main scans performed for each position in a printing range on the medium is set in the movement amount setting unit, and the basic movement amount indicates a value obtained by dividing the nozzle length, which is the width of the nozzle row of the inkjet head in the sub-scanning direction, by the pass number.

16. The printing device as set forth in claim 15, wherein a plurality of types of values including non-integer values is capable of being set as the pass number.

17. The printing device as set forth in claim 16, wherein as the non-integer value, a value having a pitch size of at least less than or equal to 0.25 is capable of being set.

18. A printing method that performs printing on a medium, the printing method comprising:
causing an inkjet head that ejects ink to the medium to perform:
a main scan of ejecting ink while moving relative to the medium in a main scanning direction set in advance, and
a sub scan of moving the inkjet head relative to the medium in a sub-scanning direction orthogonal to the main scanning direction;
using, at the time of setting a sub-scanning movement amount for setting a sub-scanning movement amount, which is a distance for moving the inkjet head in the sub-scanning direction relative to the medium in the sub scan, a correction coefficient, which is a coefficient used to calculate a calculated correction value calculated as a correction value used to correct the sub-scanning movement amount, and setting the sub-scanning movement amount based on a basic movement amount, which is a basic movement amount set according to print conditions and the calculated correction value;
using, as the correction value, at least:
a first correction coefficient used when the basic movement amount is within a first range, and
a second correction coefficient used when the basic movement amount is within a second range smaller than the first range;
calculating, when the basic movement amount is within the first range, calculated correction value based on the basic movement amount and the first correction coefficient; and
calculating, when the basic movement amount is within the second range, the calculated correction value based on the basic movement amount and the second correction coefficient.

* * * * *